United States Patent
Oh et al.

(10) Patent No.: US 9,712,781 B2
(45) Date of Patent: Jul. 18, 2017

(54) METHOD AND APPARATUS FOR TRANSMITTING AND RECEIVING ULTRA-HIGH DEFINITION BROADCASTING SIGNAL FOR HIGH DYNAMIC RANGE REPRESENTATION IN DIGITAL BROADCASTING SYSTEM

(71) Applicant: LG ELECTRONICS INC., Seoul (KR)

(72) Inventors: Hyunmook Oh, Seoul (KR); Jongyeul Suh, Seoul (KR); Soojin Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/909,692

(22) PCT Filed: Aug. 18, 2014

(86) PCT No.: PCT/KR2014/007621
§ 371 (c)(1),
(2) Date: Feb. 2, 2016

(87) PCT Pub. No.: WO2015/034188
PCT Pub. Date: Mar. 12, 2015

(65) Prior Publication Data
US 2016/0173811 A1    Jun. 16, 2016

Related U.S. Application Data

(60) Provisional application No. 61/874,363, filed on Sep. 6, 2013.

(51) Int. Cl.
*H04N 7/015* (2006.01)
*H04N 21/47* (2011.01)
(Continued)

(52) U.S. Cl.
CPC ........... *H04N 7/015* (2013.01); *H04N 7/0125* (2013.01); *H04N 19/46* (2014.11); *H04N 19/70* (2014.11);
(Continued)

(58) Field of Classification Search
CPC ........ H04N 21/20; H04N 21/21; H04N 21/23; H04N 21/234; H04N 21/2343;
(Continued)

(56) References Cited

U.S. PATENT DOCUMENTS

2005/0117799 A1* 6/2005 Fuh .................... G06T 5/009
382/169
2011/0150217 A1* 6/2011 Kim ............... H04N 21/234327
380/210
(Continued)

FOREIGN PATENT DOCUMENTS

JP      2010-074238 A    4/2010
KR   10-2011-0071707 A    6/2011
(Continued)

OTHER PUBLICATIONS

Deshpande, et al.: "On Color Gamut Scalable Video Coding", XP030114171, JCTVC-M0214, Joint Collaborative Team on Video Coding (JCT-VC) of ITU-T SG16 WP3 and ISO/IEC JTC1/SC29/WG11, 13th Meeting, Incheon, KR, Apr. 18-26, 2013.

*Primary Examiner* — Justin Shepard
(74) *Attorney, Agent, or Firm* — Dentons US LLP

(57) ABSTRACT

The present invention relates to a method and an apparatus for transmitting and receiving an ultra-high definition broadcasting signal for high dynamic range representation in a digital broadcasting system. An apparatus for receiving an ultra-high definition broadcasting signal according to an embodiment of the present invention comprises: a receiving unit for receiving the ultra-high definition broadcasting
(Continued)

signal including ultra-high definition broadcasting contents and high dynamic range metadata, the high dynamic range metadata indicating brightness information represented in the ultra-high definition broadcasting contents and information on a method for converting the ultra-high definition broadcast contents to be adapted to a display environment of the receiving apparatus; a decoder for decoding the received ultra-high definition broadcasting contents; and a reproduction unit for reproducing the decoded ultra-high definition broadcasting contents.

18 Claims, 13 Drawing Sheets

(51) Int. Cl.
      *H04N 21/2343* (2011.01)
      *H04N 21/845* (2011.01)
      *H04N 21/20* (2011.01)
      *H04N 21/21* (2011.01)
      *H04N 21/234* (2011.01)
      *H04N 21/4728* (2011.01)
      *H04N 21/236* (2011.01)
      *H04N 21/2362* (2011.01)
      *H04N 19/70* (2014.01)
      *H04N 19/46* (2014.01)
      *H04N 19/98* (2014.01)
      *H04N 7/01* (2006.01)
      *H04N 21/235* (2011.01)
      *H04N 21/434* (2011.01)
      *H04N 21/84* (2011.01)

(52) U.S. Cl.
      CPC ............ *H04N 19/98* (2014.11); *H04N 21/20* (2013.01); *H04N 21/21* (2013.01); *H04N 21/234* (2013.01); *H04N 21/2343* (2013.01); *H04N 21/2353* (2013.01); *H04N 21/2362* (2013.01); *H04N 21/23439* (2013.01); *H04N 21/23614* (2013.01); *H04N 21/234309* (2013.01); *H04N 21/4345* (2013.01); *H04N 21/4348* (2013.01); *H04N 21/47* (2013.01); *H04N 21/4728* (2013.01); *H04N 21/845* (2013.01); *H04N 21/8458* (2013.01); *H04N 21/84* (2013.01)

(58) Field of Classification Search
    CPC ..... H04N 21/234309; H04N 21/23439; H04N 21/47; H04N 21/4728; H04N 21/84; H04N 21/845; H04N 21/8458
    See application file for complete search history.

(56) References Cited

U.S. PATENT DOCUMENTS

| | | | |
|---|---|---|---|
| 2013/0004074 A1* | 1/2013 | Gish | H04N 5/2355 382/173 |
| 2013/0083838 A1* | 4/2013 | Touze | H04N 5/2355 375/240.01 |
| 2013/0314495 A1* | 11/2013 | Chen | H04N 13/0048 348/43 |

FOREIGN PATENT DOCUMENTS

| | | |
|---|---|---|
| KR | 10-2012-0055362 A | 5/2012 |
| KR | 10-2013-0036730 A | 4/2013 |
| KR | 10-2013-0058034 A | 6/2013 |
| KR | 10-2013-0082163 A | 7/2013 |
| KR | 10-2013-0088741 A | 8/2013 |
| WO | 2009/093869 A1 | 7/2009 |
| WO | 2010/120137 A2 | 10/2010 |
| WO | 2013/015596 A2 | 1/2013 |
| WO | 2013/046095 A1 | 4/2013 |
| WO | 2013/046096 A1 | 4/2013 |

* cited by examiner

FIG. 2
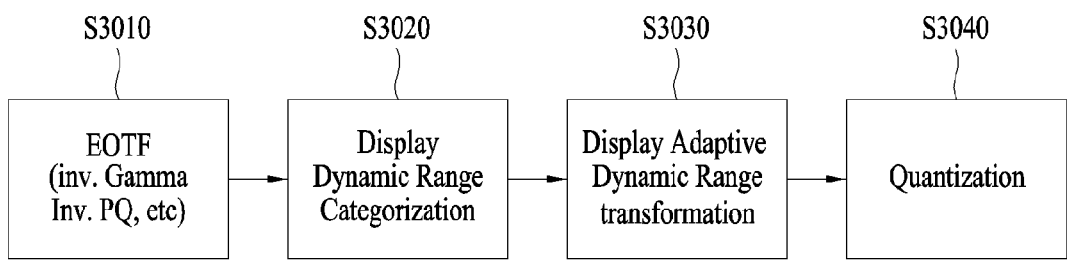
FIG. 3
S3010 → EOTF (inv. Gamma Inv. PQ, etc) → S3020 Display Dynamic Range Categorization → S3030 Display Adaptive Dynamic Range transformation → S3040 Quantization
FIG. 4
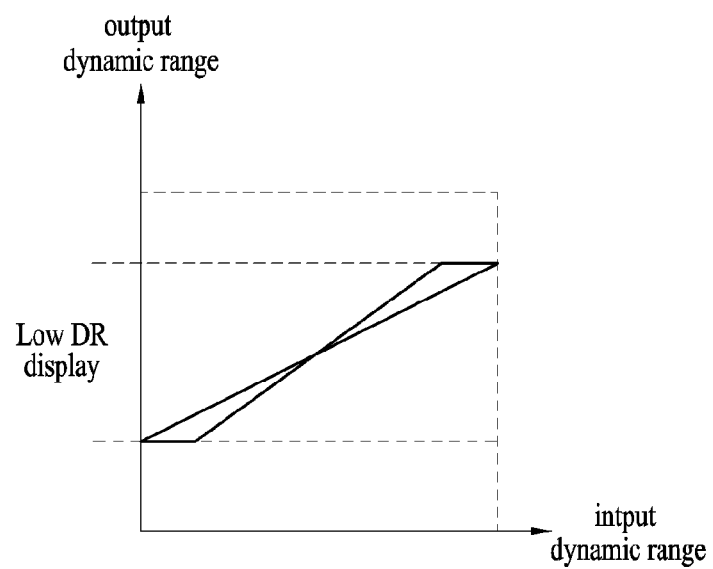

FIG. 7

| sei_payload( payloadType, payloadSize ) { | Category | Descriptor |
|---|---|---|
| ... | | |
| if( payloadType == 53 ) | | |
|     Dynamic_range_transformation_info(payloadSize) | 5 | |

FIG. 8

| Dynamic_range_transformation_info(payloadSize) { | C | Descriptor |
|---|---|---|
| luminance_max | | |
| luminance_min | | |
| private_EOTF | | |
| if(private_EOTF == 1){ | | |
|     number_of_coeff | | |
|     for(i=0; i<number_of_coeff; i++) | | |
|         transfer_curve_coeff[i] | | |
| } | | |
| clipping_flag | | |
| linear_mapping_flag | | |
| if(clipping_flag == 1) { | | |
|     luma_clipping_upper_bound | | |
|     luma_clipping_lower_bound | | |
| } | | |
| luminance_upper_bound | | |
| luminance_lower_bound | | |
| luma_upper_value | | |
| luma_lower_value | | |
| mid_DR_transformation_curve_type | | |
| mid_DR_transformation_curve() | | |
| mid_DR_percentage | | |
| upper_DR_transformation_curve_type | | |
| upper_DR_transformation_curve() | | |
| upper_DR_percentage | | |
| lower_DR_transformation_curve_type | | |
| lower_DR_transformation_curve() | | |
| number_luminance_upper_bound_diff | | |
| for(i=0; number_luminance_upper_bound_diff; i++) { | | |
|     luminance_upper_bound_diff[i] | | |
|     luma_upper_value_diff[i] | | |
|     upper_DR_transformation_curve_type[i] | | |
|     upper_DR_transformation_curve() | | |
|     upper_DR_percentage[i] | | |
|     mid_DR_percentage[i] | | |
| } | | |

FIG. 9

| mid_DR_transformation_curve_type | Description |
|---|---|
| 0x00 | Linear function |
| 0x01 | Logarithmic function |
| 0x02 | Exponential function |
| 0x03 | S-curve |
| 0x04 | combination |
| 0x05 | Look-up table |
| 0x06 ~ 0xFF | Reserved |

FIG. 10

| Syntax | No. of bits | Format |
|---|---|---|
| DR_transformation_curve ( ) { | | |
|   if (DR_transformation_curve_type=='0x00') { | | |
|     gradient | | uimsbf |
|   } | | |
|   else if (DR_transformation_curve_type=='0x01') { | | |
|     coeff_a | | uimsbf |
|   } | | |
|   else if (DR_transformation_curve_type=='0x02') { | | |
|     coeff_a | | uimsbf |
|   } | | |
|   else if (DR_transformation_curve_type=='0x03') { | | |
|     intersection_x | | uimsbf |
|     coeff_a1 | | uimsbf |
|     coeff_a2 | | uimsbf |
|   } | | |
|   else if (DR_transformation_curve_type=='0x04') { | | |
|     number_section | | uimsbf |
|     for(i=0; number_section; i++){ | | |
|       intersection_x[i] | | uimsbf |
|       DR_transformation_curve_type[i] | | uimsbf |
|       if (DR_transformation_curve_type=='0x00') { | | |
|         gradient[i] | | uimsbf |
|       } | | |
|       else if (DR_transformation_curve_type=='0x01') { | | |
|         coeff_a[i] | | uimsbf |
|       } | | |
|       else if (DR_transformation_curve_type=='0x02') { | | |
|         coeff_a[i] | | uimsbf |
|       } | | |
|   else if (DR_transformation_curve_type=='0x05') { | | |
|     entry_length | | uimsbf |
|     for (i=0; i<entry_length; i++) { | | |
|       in_value | | uimsbf |
|       out_value | | uimsbf |
|     } | | |
|   } | | |
| } | | |

FIG. 11

| Syntax | No. of Bits | Format |
|---|---|---|
| event_informaion_table_section() { | | |
|     table_id | 8 | 0xCB |
|     section_syntax_indicator | 1 | '1' |
|     pricate_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j=0; j<num_events_in_section; j++_ { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for (i=0; i<N; i++) { | | |
|             descriptor() | | |
|         } | | |
|     } | | |
|     CRC_32 | 32 | rpchof |
| } | | |

FIG. 12

| Syntax | No. of bits | Format |
|---|---|---|
| dynamic_range_transformation_info_descriptor ( ) { | | |
|     descriptor_tag | 8 | uimsbf |
|     descriptor_length | 8 | uimsbf |
|     reserved | 4 | |
|     number_of_HDR_info | 4 | |
|     for(i=0; i<number_of_color_info; i++) { | | |
|         dynamic_range_transformation_metadata () | | |
|     } | | |
| } | | |

FIG. 13

| dynamic_range_transformation_metadata () { | No. of bits | Format |
|---|---|---|
|     luminance_max | | |
|     luminance_min | | |
|     luminance_upper_bound | | |
|     luminance_lower_bound | | |
|     number_luminance_upper_bound_diff | | |
|     for(i=0; number_luminance_upper_bound_diff; i++) { | | |
|         luminance_upper_bound_diff[i] | | |
|     } | | |
| } | | |

FIG. 14

| Syntax | No. of bits | Format |
|---|---|---|
| UHD_program_info_descriptor ( ) { | | |
| descriptor_tag | 8 | uimsbf |
| descriptor_length | 8 | uimsbf |
| UHD_service_type | 4 | uimsbf |
| Reserved | 4 | |
| } | | |

FIG. 15

| UHD_service_type | Example of usage |
|---|---|
| 0000 | UHD1 |
| 0001 | UHD2 |
| 0010-0111 | Reserved |
| 1000-1111 | User_private |

FIG. 16

| Syntax | No. of Bits | Format |
|---|---|---|
| terrestrial_virtual_channel_table_section() { | | |
|     table_id | 8 | 0xCB |
|     section_syntax_indicator | 1 | '1' |
|     pricate_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_channels_in_section | 8 | uimsbf |
|     for (j=0; i<num_channels_in_section; i++_ { | | |
|         short_name | 7*16 | '11' |
|         reserved | 4 | uimsbf |
|         major_channel_number | 10 | uimsbf |
|         minor_channel_number | 10 | '11' |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for (i=0; i<N; i++) { | | |
|             descriptor() | | |
|         } | | |
|     } | | |

| Service scenario | service _type | Descriptors |
|---|---|---|
| UHD | 0x07 | Component list descriptor<br>Service location descriptor<br>UHD descriptor |
| | 0x09 | Component list descriptor<br>Parameterized service descriptor<br>Service location descriptor |
| | 0x10 | UHD descriptor<br>Service location descriptor |

METHOD AND APPARATUS FOR TRANSMITTING AND RECEIVING ULTRA-HIGH DEFINITION BROADCASTING SIGNAL FOR HIGH DYNAMIC RANGE REPRESENTATION IN DIGITAL BROADCASTING SYSTEM

This application is a U.S. National Phase Application under 35 U.S.C. §371 of International Application PCT/KR2014/007621 filed on Aug. 18, 2014, which claims the benefit of U.S. Provisional Application No. 61/874,363 filed Sep. 6, 2013, the entire content of the prior applications is hereby incorporated by reference.

TECHNICAL FIELD

The present invention relates to a broadcasting system, and more particularly, to a method and/or apparatus for transceiving an ultra-high definition broadcast signal for high dynamic range representation in a digital broadcasting system.

BACKGROUND ART

Recently, the propagation and demand for audio/video oriented multimedia contents are rapidly expanding in various fields of Internet, personal media and the like as well as in fields of broadcasts and movies owing to the developments of the digital technology and the communication technology. As 3D TVs/movies providing 3D effect through broadcasts/movies are generalized, consumer's demands for Immersive Media providing reality and realism are increasing. Moreover, as a TV is equipped with a wide screen at home in addition to the development of a display technology, contents of high image quality amounting to HD or higher are increasingly enjoyed and consumed. To prepare for Post-HDTV markets, Realistic Broadcasting such as 3D TV or UHD (ultra high definition) TV is spotlighted as a next generation broadcasting service. Particularly, the ongoing discussions of UHD (ultra high definition) broadcasting service are increasingly rising.

The goal of UHD broadcasting is to provide viewers with abundant colors, improved image quality and immersion in various aspects in comparison with the existing HD broadcasting. To this end, it is able use a method of extending a range of luminance represented in a content to a dynamic range actually recognizable in human vision system. In particular, by providing improved brightness and high contrast through a ultrahigh definition content, a user currently watching the ultrahigh definition content can experience more immersion and realism. However, a high dynamic range represented in a content is not supported by a display, it may cause a problem that a viewer watches a quality degraded image or an information lost image against content producer's intention.

UHD broadcasting represents brightness failing to be represented in an existing content, thereby being differentiated from the existing broadcasting. The UHD broadcasting can provide a viewer with a high level of realism. Recently, HDR contents tend to be produced through image input equipments having High Dynamic Range (HDR). However, since a display supportive of HDR is still in a stage of prototype development, it causes a problem in fully representing HDR contents. Hence, viewers still experience inconvenience in watching HDR contents.

The UHD broadcasting extends a luminance represented range among various factors for providing a high quality image, thereby providing an image with sense of high reality. To this end, a content should be acquired and produced through equipments capable of accommodating a dynamic range beyond an existing dynamic range and a display or a screening equipment capable of supporting a luminance representation range of such a content should be provided. Yet, in an environment that a display having various luminance related characteristics exists, it may happen that a viewer watches a provided content through a display incapable of sufficiently accommodating a dynamic range of the provided content. Since information for preparing for a display environment of a receiving side is not provided as well as luminance information of a transmitted content in a content providing environment through a current broadcast or digital media, it causes a problem that image quality degradation is generated from the receiving side.

DISCLOSURE OF THE INVENTION

Technical Task

To solve the problems mentioned in the foregoing description, the technical task of the present invention is to provide a method and/or apparatus for transceiving a ultra-high definition broadcast signal for high dynamic range representation in a digital broadcasting system.

And, the technical task of the present invention is to provide a method and/or apparatus for transceiving a ultra-high definition broadcast signal, by which a viewer can watch a content having a dynamic range intended by a content producer.

Moreover, the technical task of the present invention is to provide a method and/or apparatus for receiving a content transformed to fit a display environment of a receiving device.

Technical Solutions

In one technical aspect of the present invention, provided herein is an apparatus for receiving an ultra high definition broadcast signal according to one embodiment of the present invention, including a receiving unit receiving the ultra high definition broadcast signal including a ultra high definition broadcast content and a high dynamic range metadata indicating a luminance information represented in the ultra high definition broadcast content and an information on a method of transforming the ultra high definition broadcast content to fit a display environment of the receiving apparatus, a decoder configured to decode the received ultra high definition broadcast content, and a play unit configured to play the decoder ultra high definition broadcast content.

Preferably, the high dynamic range metadata includes at least one of a maximum reference luminance information indicating a maximum reference luminance represented in the UHD broadcast content, a minimum reference luminance information indicating a minimum reference luminance represented in the ultra high definition broadcast content, a mandatory maximum luminance information indicating a maximum value of a mandatorily represented dynamic range in a dynamic range represented in the ultra high definition broadcast content, a mandatory minimum luminance information indicating a minimum value of the mandatorily represented dynamic range in the dynamic range represented in the ultra high definition broadcast content, and an additional region difference information used to extend the mandatorily represented dynamic range in the dynamic range represented in the ultra high definition broadcast content.

More preferably, the apparatus further includes a dividing unit configured to classify the display environment of the receiving apparatus by comparing the maximum reference luminance information and the mandatory maximum luminance information included in the high dynamic range metadata to a maximum value of a dynamic range representable in a display of the receiving apparatus, the display environment of the receiving apparatus is classified into a $1^{st}$ case that the maximum value of the dynamic range representable in the display of the receiving apparatus is equal to or smaller than a value indicated by the mandatory maximum luminance information, a $2^{nd}$ case that the maximum value of the dynamic range representable in the display of the receiving apparatus is greater than the value indicated by the mandatory maximum luminance information and smaller than a value indicated by the maximum reference luminance information, and a $3^{rd}$ case that the maximum value of the dynamic range representable in the display of the receiving apparatus is equal to or greater than the value indicated by the maximum reference luminance information.

Preferably, the apparatus further includes a control unit configured to transform the ultra high definition broadcast content using the received high dynamic range metadata if the display environment of the receiving apparatus corresponds to either the $1^{st}$ case or the $2^{nd}$ case, the control unit configured not to transform the ultra high definition broadcast content if the display environment of the receiving apparatus corresponds to the $3^{rd}$ case.

Preferably, the control unit divides the dynamic range represented in the ultra high definition broadcast content using the mandatory minimum luminance information, the mandatory maximum luminance information, the maximum reference luminance information and the minimum reference luminance information included in the high dynamic range metadata, the control unit transforms the ultra high definition broadcast content using a transformation method of a different type per section, and the dynamic range represented in the ultra high definition broadcast content is divided into a core dynamic range region corresponding to a region between a value indicated by the mandatory minimum luminance information and a value indicated by the mandatory minimum luminance information, an upper dynamic range region corresponding to a region between a value indicated by the mandatory maximum luminance information and a value indicated by the minimum reference luminance information, and a lower dynamic range region corresponding to a region between a value indicated by the minimum reference luminance information and a value indicated by the mandatory minimum luminance information.

Preferably, the control unit extends the core dynamic range region using the additional region difference information included in the high dynamic range metadata and the upper dynamic range region is changed correspondingly.

Preferably, the high dynamic range metadata includes at least one of a transformation curve type information for identifying a type of a transformation curve used for transformation of the ultra high definition broadcast content in each divided dynamic range section of the ultra high definition broadcast content, a transformation curve detailed information indicating detailed information on the identified transformation curve, and a luminance region rate information indicating a rate occupied by each section of the divided dynamic range in a representable dynamic range of the receiving apparatus.

Preferably, the high dynamic range metadata includes a clipping flag information indicating a presence or non-presence of a use of a clipping operation for playing luminance of a specific range in the dynamic range represented in the UHD broadcast content only and a clipping dynamic range information indicating luminance of a specific range played in the dynamic range represented in the UHD broadcast content in case of the presence of the use of the clipping option. If the clipping option is used, a luminance of a specific range indicated by the clipping dynamic range information in the dynamic range represented in the ultra high definition broadcast content is played only.

Preferably, the high dynamic range metadata is transmitted in a manner of being included in an SEI message or an event information table (EIT) containing information on each event configuring the ultra high definition broadcast content.

In another technical aspect of the present invention, provided herein is a method of transmitting an ultra high definition broadcast signal according to another embodiment of the present invention, including the steps of encoding an ultra high definition video data configuring an ultra high definition broadcast content and a high dynamic range metadata indicating a luminance information represented in the ultra high definition broadcast content and an information on an option for transforming the ultra high definition broadcast content to fit a display environment of a receiving device, multiplexing the encoded ultra high definition video data and the encoded high dynamic range metadata, and transmitting the multiplexed ultra high definition video data and the multiplexed high dynamic range metadata.

Preferably, the high dynamic range metadata includes at least one of a maximum reference luminance information indicating a maximum reference luminance represented in the UHD broadcast content, a minimum reference luminance information indicating a minimum reference luminance represented in the ultra high definition broadcast content, a mandatory maximum luminance information indicating a maximum value of a mandatorily represented dynamic range in a dynamic range represented in the ultra high definition broadcast content, a mandatory minimum luminance information indicating a minimum value of the mandatorily represented dynamic range in the dynamic range represented in the ultra high definition broadcast content, and an additional region difference information used to extend the mandatorily represented dynamic range in the dynamic range represented in the ultra high definition broadcast content.

Preferably, the dynamic range represented in the ultra high definition broadcast content is divided using the mandatory minimum luminance information, the mandatory maximum luminance information, the maximum reference luminance information and the minimum reference luminance information included in the high dynamic range metadata, the ultra high definition broadcast content is transformed for each divided section by a transforming option of a different type, and the dynamic range represented in the ultra high definition broadcast content is divided into a core dynamic range region corresponding to a region between a value indicated by the mandatory minimum luminance information and a value indicated by the mandatory minimum luminance information, an upper dynamic range region corresponding to a region between a value indicated by the mandatory maximum luminance information and a value indicated by the minimum reference luminance information, and a lower dynamic range region corresponding to a region between a value indicated by the minimum reference luminance information and a value indicated by the mandatory minimum luminance information.

Preferably, the core dynamic range region is extended using the additional region difference information included in the high dynamic range metadata and the upper dynamic range region is changed correspondingly.

Preferably, the high dynamic range metadata includes at least one of a transformation curve type information for identifying a type of a transformation curve used for transformation of the ultra high definition broadcast content in each divided dynamic range section of the ultra high definition broadcast content, a transformation curve detailed information indicating detailed information on the identified transformation curve, and a luminance region rate information indicating a rate occupied by each section of the divided dynamic range in a representable dynamic range of the receiving device.

Preferably, the high dynamic range metadata includes a clipping flag information indicating a presence or non-presence of a use of a clipping operation for playing luminance of a specific range in the dynamic range represented in the UHD broadcast content only and a clipping dynamic range information indicating luminance of a specific range played in the dynamic range represented in the UHD broadcast content in case of the presence of the use of the clipping option.

Preferably, the high dynamic range metadata is transmitted in a manner of being included in an SEI message or an event information table (EIT) containing information on each event configuring the ultra high definition broadcast content.

ADVANTAGEOUS EFFECTS

According to the present invention, an ultra-high broadcast content having a dynamic range intended by a content producer can be received/played.

According to the present invention, a content transformed to fit a display environment of a receiving device can be received/played.

According to the present invention, a viewer can be provided with an optimal appreciation environment in consideration of characteristics of a content and a display of a receiving device.

According to the present invention, a content producer can deliver intention on a provided content to a viewer in direct.

According to the present invention, a viewer can be provided with an optimal watching environment in consideration of characteristics of a display of the viewer without changing the display in response to a received content.

DESCRIPTION OF DRAWINGS

FIG. 2 is a diagram to illustrate a determination reference for distinguishing a display environment of a receiving device according to one embodiment of the present invention.

FIG. 3 is a diagram to illustrate an image processing process of an ultra high definition broadcast content according to one embodiment of the present invention.

FIG. 4 is a diagram to illustrate a clipping option and a linear dynamic range transformation method according to one embodiment of the present invention.

FIG. 7 is a diagram to illustrate a structure of SEI (supplemental enhancement information) message according to one embodiment of the present invention.

FIG. 8 is a diagram to illustrate high dynamic range metadata (dynamic range transformation info (payload Size)) transmitted by being included in SEI (supplemental enhancement information) message according to one embodiment of the present invention.

FIG. 9 is a diagram to illustrate core region transformation curve type information (mid_DR_transformation_curve_type) according to one embodiment of the present invention.

FIG. 10 is a diagram to illustrate transformation curve detailed information (DR_transformation_curve) according to one embodiment of the present invention.

FIG. 11 is a diagram to illustrate EIT (event information table) according to one embodiment of the present invention.

FIG. 12 is a diagram to illustrate a dynamic range transformation information descriptor (dynamic_range_transformation_info_descriptor) according to one embodiment of the present invention.

FIG. 13 is a diagram to illustrate high dynamic range metadata (dynamic_range_transformation_metadata( )) included in a dynamic range transformation information descriptor (dynamic_range_transformation_info_descriptor( )) according to one embodiment of the present invention.

FIG. 14 is a diagram to illustrate an ultra high definition program information descriptor (UHD_program_info_descriptor( )) according to one embodiment of the present invention.

FIG. 15 is a diagram to illustrate UHD_service_type field included in an ultra high definition program information descriptor (UHD_program_info_descriptor( )) according to one embodiment of the present invention.

FIG. 16 is a diagram to illustrate TVCT (terrestrial virtual channel table) according to one embodiment of the present invention.

BEST MODE FOR INVENTION

Reference will now be made in detail to the preferred embodiments of the present invention, examples of which are illustrated in the accompanying drawings. And, the present invention may be non-limited by the preferred embodiments of the present invention.

Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Figure 1:
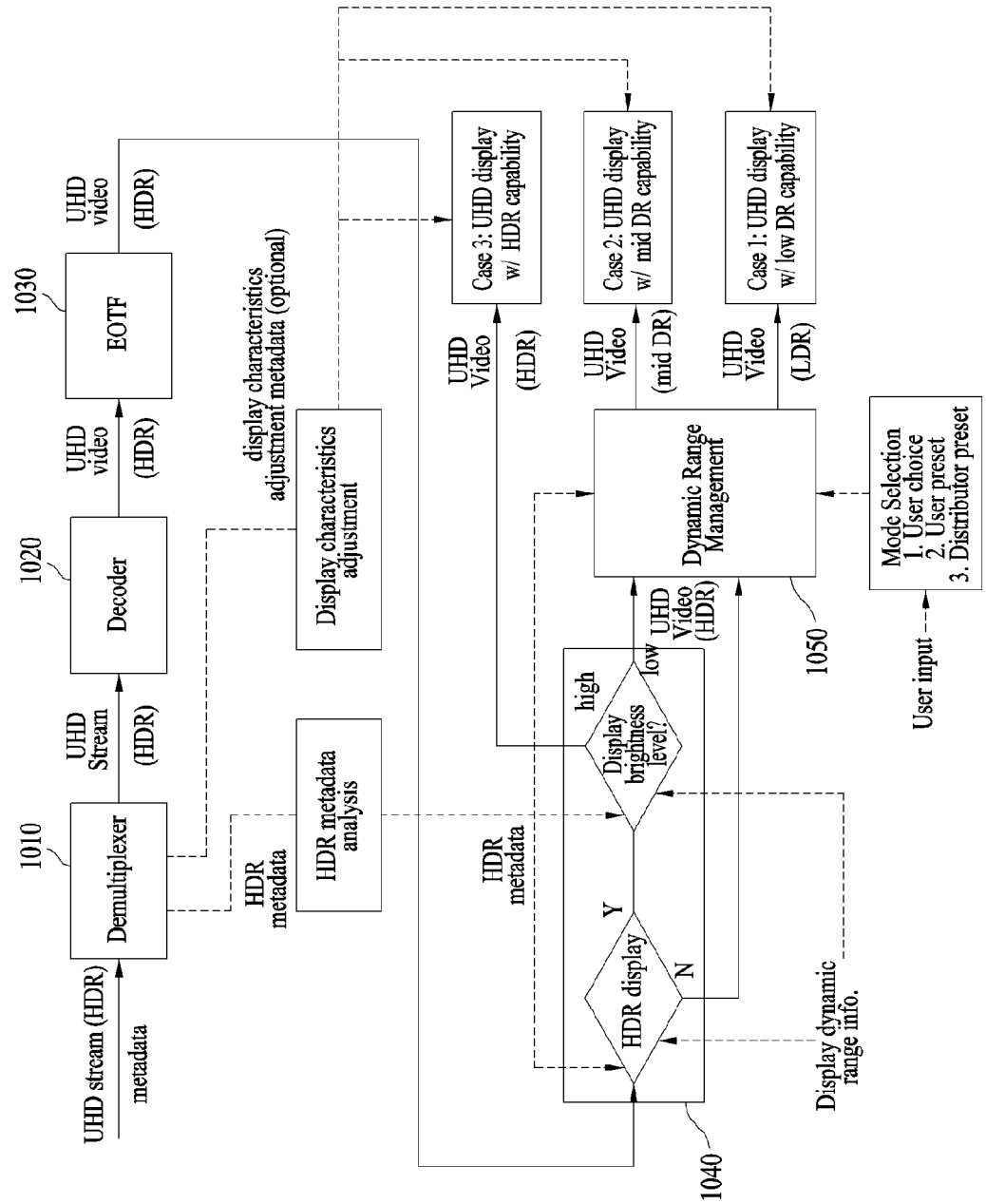
FIG. 1 is a diagram for an operating flow of an ultra high definition broadcast signal receiving device according to one embodiment of the present invention.

FIG. 1 is a diagram showing the workflow of a UHD broadcast signal reception device according to one embodiment of the present invention.

The UHD broadcast signal reception device according to one embodiment of the present invention may include a demultiplexer 1010, a decoder 1020, an electro optical transfer function (EOTF) unit 1030, a categorization unit 1040 and/or a controller 1050.

The demultiplexer 1010 may include a receiver (not shown). The receiver may receive UHD broadcast content and receive high dynamic range (HDR) metadata. The HDR metadata may indicate information on a method for transforming the UHD broadcast content to suit a display characteristics of a reception device and brightness information of the UHD broadcast content. The demultiplexer may demultiplex the multiplexed UHD stream into elementary streams. For example, a unit stream may include a video unit stream for transmitting video data, an audio unit stream for transmitting audio data, etc. The HDR metadata may be multiplexed with UHD media data and may be received as one UHD broadcast stream. In this case, the demultiplexer may demultiplex the multiplexed UHD broadcast stream into unit streams and/or display information metadata.

The decoder 1020 may decode media data transmitted by the demultiplexed unit streams and/or display information metadata. The media data transmitted by the unit streams may include UHD video data.

The EOTF unit 1030 may perform an appropriate operation according to a transfer curve used in an encoding process with respect to the decoded UHD video data. At this time, in addition to an existing EOTF, an EOTF suitable for HDR may be used and arbitrary EOTF may be newly defined and used. Examples of the existing EOTF may include gamma transformation described in ITU-R BT. 1886. Examples of the EOTF suitable for HDR may include perceptual quantization. As the arbitrary EOTF, a new-EOTF may be used. Information on the EOTF used in the EOTF unit may be transmitted via a voice user interface (VUI) message or metadata. The information on the EOTF may be included in the HDR metadata according to one embodiment of the present invention and transmitted, which will be described in detail below. The EOTF unit may perform the EOTF according to the workflow of the reception device after the processing procedure of the controller or during the processing procedure of the controller. As shown in this figure, in the operation of the reception device according to one embodiment of the present invention, transformation in linear luminance gradation is assumed. Accordingly, the reception device according to one embodiment of the present invention performs the EOTF just after decoding. Here, the EOTF is a transformation function indicating a relationship between the digital input value and output brightness value of the display or a relationship between the input brightness value and output digital value of the display.

The categorization unit 1040 may compare expressible dynamic range (DR) information of the display of the reception device according to one embodiment of the present invention and DR information of the UHD broadcast content received via the UHD metadata and determine whether content transformation is necessary. Here, the expressible DR information of the display of the reception device may include a highest value, a lowest value and a bit depth of the expressible dynamic range of the reception device. Here, the DR information of the UHD broadcast content may include highest reference brightness information indicating expressible highest reference brightness of the UHD broadcast content, lowest reference brightness information indicating expressible lowest reference brightness of the UHD broadcast content, and a bit depth. The categorization unit may categorize the display characteristics of the reception device according to a predetermined criterion. According to one embodiment of the present invention, the display characteristics of the reception device may be categorized into a display having an existing dynamic range (case 1), a display which has a dynamic range wider than an existing dynamic range but does not accommodate the dynamic range of the UHD broadcast content (case 2) and a display having a dynamic range wider than the dynamic range of the UHD broadcast content (case 3). The predetermined criterion for categorizing the display characteristics of the reception device and the existing dynamic range will be described in detail below.

The controller 1050 may transform the UHD broadcast content to suit the display characteristics of the reception device according to one embodiment of the present invention. In addition, the controller may transform the UHD broadcast content to suit the display characteristics of the reception device according to one embodiment of the present invention, which is categorized by the categorization unit. The controller may divide the dynamic range of the UHD broadcast content according to a predetermined criterion and transform the UHD broadcast content using different types of transformation methods according to ranges. The criterion for categorizing the dynamic range of the content will be described below. The controller may transform the UHD broadcast content using the received HDR metadata when the display characteristics of the reception device according to one embodiment of the present invention correspond to case 1 or case 2 and may not transform the UHD broadcast content when the display characteristics of the reception device according to one embodiment of the present invention correspond to case 3.

The UHD broadcast signal reception device according to one embodiment of the present invention may include a playback unit for playing UHD broadcast content back. The playback unit may play the content only in a specific dynamic range indicated by clipping dynamic range information of the entire dynamic range of the UHD broadcast content, if a clipping option is used.

A process of transforming the UHD broadcast content according to one embodiment of the present invention may be pre-specified as preset of TV by a viewer. In this case, the UHD broadcast content may be automatically transformed without a separate selection step. If content transformation is pre-specified as preset of TV, such settings may be maintained even when the channel is changed. Content transformation may be specified in a step of supplying UHD broadcast content. In this case, when the reception device supports content transformation, content may be automatically transformed without a separate selection step.

According to one embodiment of the present invention, the HDR metadata including brightness information of the UHD broadcast content may be received scene by scene.

According to one embodiment of the present invention, even in a scheduled viewing environment, UHD broadcast content having an HDR based on HDR metadata may be previously announced via an electronic program guide (EPG). In this case, a viewer may schedule transformation of specific content on the EPG. At this time, the reception device may store transformation of the specific content and automatically transform UHD broadcast content to suit the display characteristics of the reception device when the specific content is selected.

The reception device according to one embodiment of the present invention may store transformation related information of the content, which is broadcast via a current channel and transformed according to the display characteristics of the reception device, upon channel change, and play the content back using the stored transformation related information when returning to the current channel and continuing to broadcast the content.

The reception device according to one embodiment of the present invention may receive display information metadata necessary to control the display characteristics of the reception device to a display characteristics suitable for received UHD broadcast content. In this case, the reception device according to one embodiment of the present invention may control the display characteristics of the reception device to suit UHD broadcast content using received display information metadata.

FIG. 2 is a diagram showing a criterion for categorizing the display characteristics of the reception device according to one embodiment of the present invention.

The display characteristics of the UHD broadcast signal reception device according to one embodiment of the present invention may be categorized into a display having an existing dynamic range (case 1), a display which has a dynamic range wider than an existing dynamic range but does not accommodate the dynamic range of the UHD broadcast content (case 2) and a display having a dynamic range wider than the dynamic range of the UHD broadcast content (case 3).

The criterion for categorizing the display characteristics of the reception device according to one embodiment of the present invention may include maximum reference brightness information luminance_max indicating maximum reference brightness of the UHD broadcast content, essential maximum brightness information luminance_upper_bound indicating the maximum value of the essential dynamic range of the dynamic range of the UHD broadcast content and the maximum value max_display_brightness of the dynamic range expressible by the display of the UHD broadcast signal reception device.

Referring to this figure, the maximum value max_display_brightness of the dynamic range expressible by the display of the reception device is equal to or greater than a value obtained by adding a predetermined value (alpha) to the maximum reference brightness luminance_max of the content, the display of the reception device according to one embodiment of the present invention may correspond to case 3. If the condition of case 3 is not satisfied and the maximum value max_display_brightness of the dynamic range expressible by the display of the reception device is equal to or less than a value obtained by adding a predetermined value (beta) to essential maximum brightness luminance_upper_bound indicating the maximum value of the essential dynamic range of the content, the display of the reception device according to one embodiment of the present invention may correspond to case 1. If the conditions of case 3 and case 1 are not satisfied, the display of the reception device according to one embodiment of the present invention may correspond to case 2. Here, the existing dynamic range of display having the existing dynamic range (case 1) may mean a range less than a value obtained by adding the predetermined value (beta) to the essential maximum brightness luminance_upper_bound indicating the maximum value of the essential dynamic range of the content. In this figure, the alpha and beta values may be pre-set by referring to the characteristics of the UHD broadcast content and the display of the reception device according to one embodiment of the present invention or may be additionally transmitted.

According to one embodiment of the present invention, the alpha and beta as the predetermined values may be set to 0. In this case, the display characteristics of the reception device according to one embodiment of the present invention may be categorized into a first case (case 1) in which the maximum value of the dynamic range expressible by the display of the reception device is equal to or less than the value indicated by the essential maximum brightness information, a second case (case 2) in which the maximum value of the dynamic range expressible by the display of the reception device is greater than the value indicated by the essential maximum brightness information and is less than the value indicated by the maximum reference brightness information, and a third case (case 3) in which the maximum value of the dynamic range expressible by the display of the reception device is equal to or greater than the maximum reference brightness information.

According to one embodiment of the present invention, as the criterion for categorizing the display characteristics of the UHD broadcast signal reception device, the maximum reference brightness information, the essential maximum brightness information and the maximum value of the dynamic range expressible by the display of the reception device may be used. Here, the maximum value of the dynamic range is used as the criterion because the percentage of a high luminance component (bright part) is relatively high in HDR video as compared to low dynamic range (LDR) video. However, as necessary, a low luminance component (dart part) may be used as the criterion for categorizing the display characteristics of the UHD broadcast signal reception device. In this case, minimum reference brightness information luminance_min indicating minimum reference brightness of UHD broadcast content, essential minimum brightness information luminance_lower_bound indicating the minimum value of the essential dynamic range of the dynamic range of the UHD broadcast content and the minimum value min_display_brightness of the dynamic range expressible by the display of the UHD broadcast signal reception device.

The criterion used to categorize the display characteristics of the reception device according to one embodiment of the present invention may be included in the HDR metadata and transmitted.

FIG. 3 is a diagram showing a video processing procedure of UHD broadcast content according to one embodiment of the present invention.

The video processing procedure of the UHD broadcast content according to one embodiment of the present invention may include EOTF step S3010, display dynamic range categorization step S3020, display adaptive dynamic range transformation step S3030 and/or quantization step S3040.

In the EOTF step S3010, the decoded UHD video data may be transformed using the EOTF. For a detailed description of the EOTF, refer to the description of the EOTF unit 1030 of the reception device according to the embodiment of the present invention.

In the display dynamic range categorization step S3020, the display characteristics of the reception device according to one embodiment of the present invention may be categorized into a display having an existing dynamic range (case 1), a display which has a dynamic range wider than an existing dynamic range but does not accommodate the dynamic range of the UHD broadcast content (case 2) and a display having a dynamic range wider than the dynamic range of the UHD broadcast content (case 3). For a detailed description thereof, refer to the description of the categorization unit 1040 of the reception device according to the embodiment of the present invention. Hereinafter, in the present specification, operation of the reception device according to one embodiment of the present invention will be described in the categorized display characteristics (case 1, case 2 and case 3) of the reception device.

In the display adaptive dynamic range transformation step S3030, the controller of the reception device according to one embodiment of the present invention may transform the dynamic range (DR) of the received UHD broadcast content in consideration of the display characteristics of the reception device. Hereinafter, the display characteristics of the reception device categorized in the dynamic range categorization steps S3020 will be described.

If the UHD broadcast signal reception device according to one embodiment of the present invention has the display having the existing dynamic range (case 1), the DR of the display may not sufficiently accommodate the DR of the content. In this case, the content may be transformed according to producer's intention in consideration of the characteristics of the reception device using the following transformation methods.

According to one embodiment of the present invention, a clipping option may be used for transformation of the UHD broadcast content. The clipping option refers to an option for disabling display of a brightness component greater or less than a predetermined value. The clipping method may be used when it is determined that the brightness components of content are concentrated in a predetermined range and it is determined that the best option is not to perform transformation when playing the content back on the display of the reception device. Clipping flag information clipping_flag included in the HDR metadata may be set to 1 to indicate that the clipping option is available. If the clipping flag information clipping_flag is 1, clipping dynamic range information luma_clipping_upper_bound or luma_clipping_lower_bound which is a digital value of the brightness of an area to be played back on the display of the reception device without separate transformation may be signaled. The clipping dynamic range information may be included in the HDR metadata and transmitted. If the clipping option is used, a problem occurring due to saturation artifacts of content is reduced even after using the clipping option. In addition, if the DR to be expressed by the UHD broadcast content, that is, the DR to be played back on the display of the reception device without separate transformation luma_clipping_upper_bound or luma_clipping_lower_bound, and the bit depth of the UHD broadcast content are equal to the DR and bit depth of the display of the reception device, information on the mid DR of the content may be maximally expressed on the display of the reception device.

According to one embodiment of the present invention, for transformation of the UHD broadcast content, a linear dynamic range transformation method may be used. Linear dynamic range transformation refers to a method of linearly mapping the entire DR of content as a method of using a transformation equation predetermined by a UHD broadcast content producer. Linear mapping flag information linear_mapping_flag included in the HDR metadata may be set to 1 to indicate that the linear dynamic range transformation method is used. In addition, the essential maximum brightness information and the maximum reference brightness information included in the HDR metadata are set to the same value, the essential minimum brightness information and the minimum reference brightness information are set to the same value and the transformation curve type information for identifying the type of the transformation curve used in the mid dynamic range is set to 0x00, thereby indicating that the linear dynamic range transformation method is used. The essential maximum brightness information, the maximum reference brightness information, the essential minimum brightness information, the minimum reference brightness information, the mid dynamic range and the transformation curve type information will be described below.

According to one embodiment of the present invention, for transformation of UHD broadcast content, an adaptive dynamic range transformation method may be used. Adaptive dynamic range transformation refers to a method of differently applying a transformation equation predetermined by a UHD broadcast content producer according to areas. In order to support various dynamic ranges of the display of the UHD broadcast signal reception device according to one embodiment of the present invention, the DR of the UHD broadcast content may be categorized into three area. The DR of the UHD broadcast content may be categorized into a mid dynamic range area indicating an area between the essential minimum brightness information luminance_lower_bound and the essential maximum brightness information luminance_upper_bound, an upper dynamic range area indicating an area between the essential maximum brightness information luminance_upper_bound and the maximum reference brightness information luminance_max and a lower dynamic range area indicating an area between the minimum reference brightness information luminance_min and the essential minimum brightness information luminance_lower_bound. Here, the mid dynamic range area may be referred to as a mid area, the upper dynamic range area may be referred to as an upper area and the lower dynamic range area may be referred to as a lower area. The percentages of the categorized areas in the DR of the display of the reception device may be transmitted. The mid dynamic range area percentage mid_DR_percentage and the upper dynamic range area percentage upper_DR_percentage may be transmitted to set brightness according to areas of the display via calculation. Here, the lower brightness area percentage may be calculated by subtracting the mid dynamic range area percentage and the upper dynamic range area percentage from 100. In order to reflect producer's intention to the transformation process of the adaptive dynamic range method according to one embodiment of the present invention, information for categorizing the dynamic range of content luminance_upper_bound and luminance_lower_bound, information on the categorized areas luma_upper_value and luma_lower_value and information on transformation equations of the categorized areas mid_DR_transformation_curve_type, upper_DR_transformation_curve_type and lower_DR_transformation_curve_type may be transmitted via high dynamic range metadata. Here, the essential minimum brightness information luminance_lower_bound, the essential maximum brightness information luminance_upper_bound, the maximum reference brightness information luminance_max, the minimum brightness information luminance_lower_bound and the mid dynamic range area percentage mid_DR_percentage and the upper_DR_percentage will be described in detail below.

When the UHD broadcast signal reception device according to one embodiment of the present invention has a wider DR than an existing DR but cannot accommodate the DR of UHD broadcast content (case 2), content may be transformed using the following transformation methods in consideration of the characteristics of the reception device and the intention of the producer.

According to one embodiment of the present invention, similarly to the case in which the UHD broadcast signal reception device has a display having an existing dynamic range (case 1), a clipping option may be used for transformation of UHD broadcast content. For this, refer to the above description of clipping in case 1.

According to one embodiment of the present invention, similarly to the case in which the UHD broadcast signal reception device has a display having an existing dynamic range (case 1), a linear dynamic range transformation method may be used for transformation of UHD broadcast content. For this, refer to the description of the linear dynamic range transformation method in case 1. Additionally, if the UHD broadcast signal reception device has a wider DR than an the existing DR but cannot accommodate the DR of UHD broadcast content (case 2), a dynamic range difference value luminance_upper_bound_diff[i] considering an additional DR expressible by the display of the reception device may be transmitted to decide a linear dynamic range transformation area. Here, the dynamic range difference value luminance_upper_bound_idff[i] considering the additional DR may be included in the high dynamic range metadata and transmitted.

According to one embodiment of the present invention, similarly to the case in which the UHD broadcast signal reception device has a display having an existing dynamic range (case 1), an adaptive dynamic range transformation method may be used for transformation of UHD broadcast content. For this, refer to the description of the adaptive dynamic range transformation method in case 1. Additionally, if the UHD broadcast signal reception device according to one embodiment of the present invention has a wider DR than an existing DR but cannot accommodate the DR of UHD broadcast content (case 2), the adaptive dynamic range transformation method may use the DR wider than the existing dynamic range of case 1. Using additional area different information luminance_upper_bound_diff[i], changed mid dynamic range area percentage information mid_DR_percentage[i] and changed upper dynamic range area percentage information upper_DR_percentage[i], the transformation degree of the per-area dynamic range DR of the dynamic range of the content may be adjusted.

If the following inequality is satisfied, $$\text{max\_display\_brightness} < \text{luminance\_upper\_bound} + \text{luminance\_upper\_bound\_diff}[0] + \ldots + \text{luminance\_upper\_bound\_diff}[i]$$

that is, if the maximum value max_display_brightness of the dynamic range expressible by the display of the UHD broadcast signal reception device is less than a value obtained by adding the additional area difference information luminance_upper_bound_diff[i] to the essential maximum brightness information luminance_upper_bound, the mid dynamic range area and/or the upper dynamic range area may be changed and thus a transformation curve applied to the changed area may be changed. Therefore, changed upper area transformation curve type information upper_DR_transformation_curve_type[i], changed upper area transformation curve detailed information upper_DR_transformation_curve( ), changed upper dynamic range area percentage information upper_DR_percentage[i] and/or changed mid dynamic range area percentage information mid_DR_percentage[i] are newly applicable. The additional area difference information, the changed upper area transformation curve type information upper_DR_transformation_curve_type[i], the changed upper area transformation curve detailed information upper_DR_transformation_curve( ), the changed upper dynamic range area percentage information upper_DR_percentage[i] and/or the changed mid dynamic range area percentage information mid_DR_percentage[i] will be described in detail below.

If the UHD broadcast signal reception device according to one embodiment of the present invention has a wider DR than that of the existing device but cannot accommodate the DR of UHD broadcast content (case 2), as compared to the existing DR of the general display, the entire output dynamic range is increased due to the added DR. At this time, if the changed mid dynamic range area percentage information mid_DR_percentage[i] is similar to that of the existing case rather than the changed upper dynamic range area percentage information upper_DR_percentage[i], this means that the mid dynamic area information is indicated in detail. If the changed upper dynamic range area percentage information upper_DR_percentage[i] is increased, this means that brightness information of a high luminance component is indicated in greater detail.

If the DR of the display of the UHD broadcast signal reception device according to one embodiment of the present invention sufficiently accommodates the DR of UHD broadcast content (case 3), the UHD broadcast content may be played back without a separate transformation process.

In quantization step S3040, the UHD broadcast content transformed to have a DR suitable for the display of the reception device according to one embodiment of the present invention may be quantized to suit the bit depth of the display.

The video processing procedure of the UHD broadcast content according to one embodiment of the present invention may further include a display characteristics adjustment step and a playback (display) step. In the display characteristics adjustment step, the display characteristics of the reception device may be adjusted to suit the display characteristics intended by the UHD broadcast content producer. Information on the display characteristics intended by the content producer may be provided via metadata and the UHD broadcast signal reception device according to one embodiment of the present invention may adjust the display characteristics using the information on the display characteristics. In the playback (display) step, content with a DR changed to suit the intention of the producer of the UHD broadcast content and the display characteristics of the reception device may be provided to a viewer. If the UHD broadcast signal reception device according to one embodiment of the present invention sufficiently accommodates the DR of UHD broadcast content (case 3), original content may be provided to a viewer without separate transformation.

FIG. 4 is a diagram showing a clipping option and a linear dynamic range transformation method according to one embodiment of the present invention.

In this figure, the x-axis denotes the DR of UHD broadcast content according to one embodiment of the present invention and the y-axis denotes a DR expressible by the display of a UHD broadcast reception device according to one embodiment of the present invention. The input dynamic range may be the DR of content before transformation of the DR and the output dynamic range may be the DR of content transformed according to the DR expressible by the display of the reception device.

The curve having a larger gradient between two transformation curves shown in this figure may indicate the case of using the clipping option and the curve having a smaller gradient may indicate the case of using the linear dynamic range transformation method.

Figure 5:
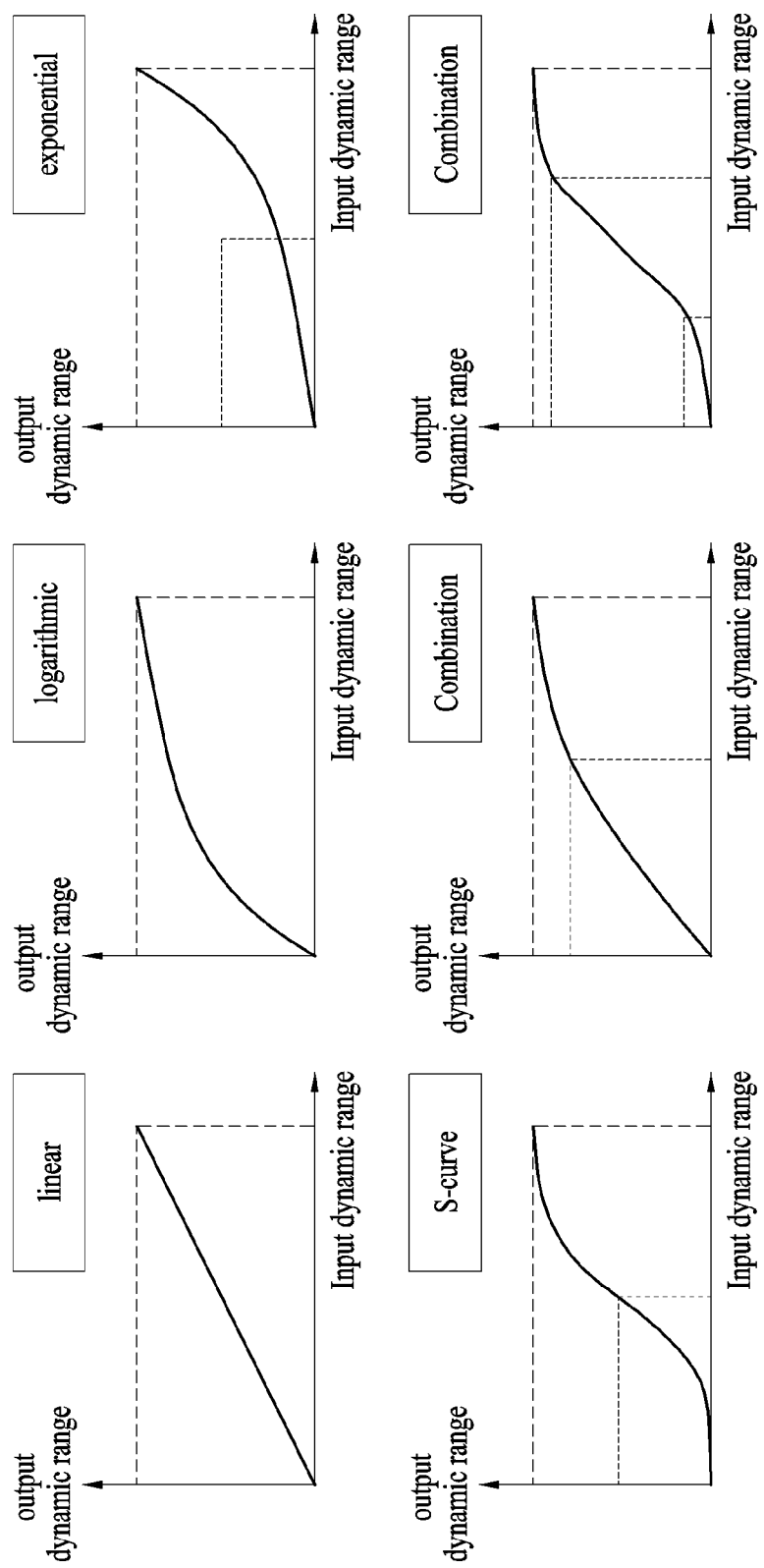
FIG. 5 is a diagram to illustrate types of a transformation curve transmitted through high dynamic range metadata according to one embodiment of the present invention.

FIG. 5 is a diagram showing the types of transformation curves transmitted via high dynamic range metadata according to one embodiment of the present invention.

According to one embodiment of the present invention, in a process of transforming UHD broadcast content to suit the display characteristics of the UHD broadcast signal reception device, a specific transformation equation pre-selected by the producer may be used. In the transformation equation used to transform content, as shown in this figure, a linear curve, an exponential curve, an S curve, a logarithmic curve, a combination curve and a look up table (LUT) may be used. An optimal transformation curve selected by the producer may be transmitted mid area transformation curve detailed information mid_DR_transformation_curve( ), upper area transformation curve detailed information upper_DR_transformation_curve( ) and lower area transformation curve detailed information lower_DR_transformation_curve( ).

Figure 6:
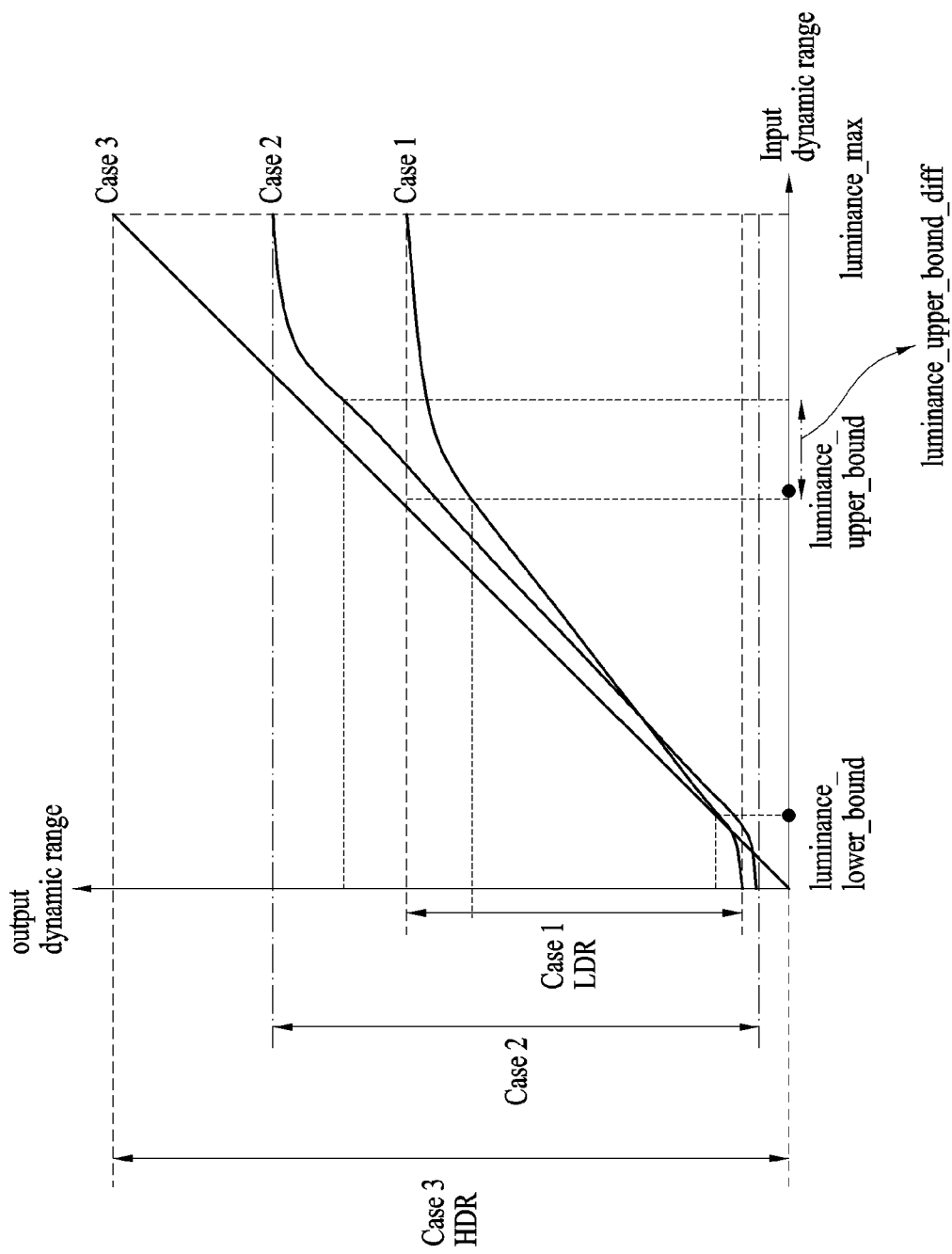
FIG. 6 is a diagram to illustrate an adaptive dynamic range depending on classification of a display of an ultra high definition broadcast signal receiving device according to one embodiment of the present invention.

FIG. 6 is a diagram showing an adaptive dynamic range transformation method according to categorization of the display of the UHD broadcast signal reception device according to one embodiment of the present invention.

The display characteristics of the UHD broadcast signal reception device according to one embodiment of the present invention may be categorized according to a predetermined criterion. The display characteristics of the UHD broadcast signal reception device may be categorized into a display having an existing dynamic range (case 1), a display which has a dynamic range wider than an existing dynamic range but does not accommodate the dynamic range of the UHD broadcast content (case 2) and a display having a dynamic range wider than the dynamic range of the UHD broadcast content (case 3). For categorization of the display characteristics, refer to the description of the categorization unit of the UHD broadcast signal reception device.

In this figure, the x-axis indicates an input dynamic range and the y-axis indicates an output dynamic range. When the DR of UHD broadcast content is received as the input dynamic range, the DR of the UHD broadcast signal reception device may be output as the output dynamic range via a transmission process.

The essential minimum brightness information luminance_lower_bound shown in this figure may indicate the minimum value of an essential dynamic range of the dynamic range of the UHD broadcast content. The essential maximum brightness information luminance_upper_bound may indicate the maximum value of the essential dynamic range of the dynamic range of the UHD broadcast content. The essential maximum brightness difference information luminance_upper_bound_diff indicating the value added to the value of the essential maximum brightness information luminance_upper_bound may be used to extend the mid dynamic range area of the content if the UHD broadcast content is transformed to suit the display which has the DR wider than the existing dynamic range but does not accommodate the DR of the UHD broadcast content. That is, in case 2, the mid dynamic range area of the UHD broadcast content may be extended by the value indicated by the essential maximum brightness difference information luminance_upper_bound_diff. As a result, in case 2, the mid dynamic range area may indicate an area between the value of the essential minimum brightness information luminance_lower_bound and the value obtained by adding the value of the essential maximum brightness difference information luminance_upper_bound_diff to the value of the essential maximum brightness information luminance_upper_bound. The maximum reference brightness information luminance_max may indicate the maximum reference brightness of the UHD broadcast content, the minimum reference brightness information luminance_min may indicate the minimum reference brightness of the UHD broadcast content and the minimum reference brightness information may indicate the value of the location of the origin in the graph although not shown in this figure.

Referring to this figure, according to one embodiment of the present invention, since the display of case 3 can express a wider DR than that of the UHD broadcast content, a linear transformation curve having a gradient of 1 may be used in the entire input dynamic range. According to one embodiment of the present invention, the display of case 2 uses a linear transformation curve in an extended mid dynamic range area and uses an exponential curve or a logarithmic curve in a lower dynamic range area and an upper dynamic range area changed by the essential maximum brightness difference information luminance_upper_bound_diff. According to one embodiment of the present invention, the display of case 1 may use a linear curve in the mid dynamic range area and use an exponential curve or a logarithmic curve in a lower dynamic range area and an upper dynamic range area. In this figure, as the transformation curve used in each area of the input dynamic range, any one of a linear curve, an exponential curve, an S curve, a logarithmic curve, a combination curve and a look up table (LUT) may be used. For the mid dynamic range area, the lower dynamic range area and the upper dynamic range area, refer to the description of the video processing procedure of the UHD broadcast content.

FIG. 7 is a diagram showing the structure of a supplemental enhancement information (SEI) message according to one embodiment of the present invention.

High dynamic range metadata (dynamic range transformation info(payloadSize) according to one embodiment of the present invention may be included in payload of a packet for transmitting the SEI message and transmitted.

FIG. 8 is a diagram showing high dynamic range transformation info(payloadSize) included and transmitted in an SEI message according to one embodiment of the present invention.

High dynamic range (HDR) metadata according to one embodiment of the present invention indicates metadata indicating information on a method for transforming UHD broadcast content to suit the display characteristics of the UHD broadcast signal reception device and brightness information of UHD broadcast content. The HDR metadata may be referred to as dynamic range transformation information, dynamic range transformation info(payloadSize) or dynamic_range_transformation_metadata( ).

The HDR metadata according to one embodiment of the present invention may include maximum reference brightness information luminance_max, minimum reference brightness information luminance_min, arbitrary EOTF information private_EOTF, number-of-EOTF-coefficient information number_of_coeff, EOTF coefficient information transfer_curve_coeff[i], clipping flag information clipping_flag, linear mapping flag information linear_mapping_flag, clipping maximum dynamic range information luma_clipping_upper_bound, clipping minimum dynamic range information luma_clipping_lower_bound, essential maximum brightness information luminance_upper_bound, essential minimum brightness information luminance_lower_bound, essential maximum digital value luma_upper_value, essential minimum brightness digital value luma_lower_value, mid area transformation curve type information mid_DR_transformation_curve_type, mid area transformation curve detailed information mid_DR_transformation_curve( ), mid dynamic range area percentage information mid_DR_percentage, upper area transformation curve type information upper_DR_transformation_curve_type, upper area transformation curve detailed information upper_DR_transformation_curve( ), upper dynamic range area percentage information upper_DR_percentage, lower area transformation curve type information lower_DR_transformation_curve_type, lower area transformation curve detailed information lower_DR_transformation_curve( ), number-of-additional-area information number_luminance_upper_bound_diff, additional area difference information luminance_upper_bound_diff[i], additional area difference digital value luma_upper_value_diff[i], changed upper area transformation curve type information upper_DR_transformation_curve_type[i], changed upper area transformation curve detailed information upper_DR_transformation_curve( ), changed upper dynamic range area percentage information upper_DR_percentage[i] and/or changed mid dynamic range area percentage information mid_DR_percentage[i].

The maximum reference brightness information luminance_max indicates the maximum reference brightness of UHD broadcast content, that is, the maximum value of the DR. For example, the maximum reference brightness of a reference monitor is 100 cd/m^2. In this case, in consideration of a general range, 1 which is the quotient of the above value divided by 100 (decimal number) may be transmitted.

The minimum reference brightness information luminance_min indicates the minimum reference brightness of UHD broadcast content, that is, the minimum value of the DR. For example, the maximum reference brightness of a reference monitor is 0.05 cd/m^2. In this case, in consideration of a general range, 5 obtained by multiplying the above value by 100 (decimal number) may be transmitted.

The arbitrary EOTF information private_EOTF indicates whether an arbitrary EOTF function is used. In general, if a widely used EOTF such as ITU-R BT.1886, REC.709 or BT.2020 is used, this may be delivered by VUI information. However, if a non-standardized EOTF is used, this field value may be set to 1. For example, perceptual quantization may be used as the non-standardized EOTF, that is, an arbitrary EOTF.

The number-of-EOTF-coefficient information number_of_coeff indicates the number of coefficients used for an arbitrary EOTF.

The EOTF coefficient information transfer_curve_coeff[i] indicates the coefficient used for an arbitrary EOTF.

The clipping flag information clipping_flag indicates whether a clipping option is used and may have a value of 1 if use of the clipping option is permitted.

The linear mapping flag information linear_mapping_flag indicates whether a linear dynamic range transformation method is used and has a value of 1 if the linear dynamic range method is used.

The clipping maximum dynamic range information luma_clipping_upper_bound indicates the digital value of an upper bound in the DR of the display if the clipping option is used.

The clipping minimum dynamic range information luma_clipping_lower_bound indicates the digital value of a lower bound in the DR of the display if the clipping option is used.

The essential maximum brightness information luminance_upper_bound indicates a maximum value of an essential DR of the DR of the UHD broadcast content (in nits). The essential maximum brightness information may become a criterion for determining the type of the display of the reception device. In addition, a separate criterion for determining the type of the display of the reception device may be signaled.

The essential minimum brightness information luminance_lower_bound indicates a minimum value of an essential DR of the DR of the UHD broadcast content (in nits). The essential minimum brightness information may become a criterion for determining the type of the display of the reception device. In addition, a separate criterion for determining the type of the display of the reception device may be signaled.

The essential maximum digital value luma_upper_value indicates a digital value corresponding to the essential maximum brightness information luminance_upper_bound.

The essential minimum brightness digital value luma_lower_value indicates a digital value corresponding to the essential minimum brightness information luminance_lower_bound.

The mid area transformation curve type information mid_DR_transformation_curve_type identifies a dynamic range transformation curve used for a mid dynamic range area. The transformation curve may be any one of a linear curve, an exponential curve, an S curve, a logarithmic curve, a combination curve and a look up table (LUT).

The mid area transformation curve detailed information mid_DR_transformation_curve( ) indicates additional information of the transformation curve identified by the mid area transformation curve type information mid_DR_transformation_curve_type. For example, gradient information may be transmitted if a linear curve is used, information on a base may be transmitted if an exponential curve or a logarithmic curve is used, information on a base and y-intercept and coordinates of an intersection may be transmitted if an S curve is used, and information on an x coordinate of each area, a curve type of each area and a graph may be transmitted if a combination curve is used.

The mid dynamic range area percentage information mid_DR_percentage indicates a percentage of a mid dynamic range area of the dynamic range of UHD broadcast content in the entire dynamic range DR of the display of the reception device.

The upper area transformation curve type information upper_DR_transformation_curve_type identifies a dynamic range transformation curve used for an upper dynamic range area. The transformation curve may be any one of a linear curve, an exponential curve, an S curve, a logarithmic curve, a combination curve and a look up table (LUT).

The upper area transformation curve detailed information upper_DR_transformation_curve( ) indicates additional information of the transformation curve identified by the upper area transformation curve type information upper_DR_transformation_curve_type. For example, gradient information may be transmitted if a linear curve is used, information on a base may be transmitted if an exponential curve or a logarithmic curve is used, information on a base and y-intercept and coordinates of an intersection may be transmitted if an S curve is used, and information on an x coordinate of each section, a curve type of each section and a graph if a combination curve is used.

The upper dynamic range area percentage information upper_DR_percentage indicates a percentage of an upper dynamic range area of the dynamic range of UHD broadcast content in the entire dynamic range DR of the display of the reception device.

The lower area transformation curve type information lower_DR_transformation_curve_type identifies a dynamic range transformation curve used for a lower dynamic range area. The transformation curve may be any one of a linear curve, an exponential curve, an S curve, a logarithmic curve, a combination curve and a look up table (LUT).

The lower area transformation curve detailed information lower_DR_transformation_curve( ) indicates additional information of the transformation curve identified by the lower area transformation curve type information lower_DR_transformation_curve_type. For example, gradient information may be transmitted if a linear curve is used, information on a base may be transmitted if an exponential curve or a logarithmic curve is used, information on a base and y-intercept and coordinates of an intersection may be transmitted if an S curve is used, and information on an x coordinate of each area, a curve type of each area and a graph if a combination curve is used.

The number-of-additional-area information number_luminance_upper_bound_diff indicates the number of variables used to extend the mid dynamic range area.

The additional area difference information luminance_upper_bound_diff[i] indicates a difference value configuring an (i+1)-th brightness value in UHD broadcast content. In the display which has a dynamic range wider than an existing dynamic range but does not accommodate the dynamic range of the UHD broadcast content (case 2), if the mid dynamic range area is extended, the essential maximum brightness information luma_upper_value may be changed to a value indicated by luminance_upper_bound+luminance_upper_bound_diff[0]+ . . . +luminance_upper_bound_diff[i].

The additional area difference digital value luma_upper_value_diff[i] indicates a digital value of an (i+1)-th brightness value in UHD broadcast content. In the display which has a dynamic range wider than an existing dynamic range but does not accommodate the dynamic range of the UHD broadcast content (case 2), if the mid dynamic range area is extended, the essential maximum brightness digital value luma_upper_value may be changed to a value indicated by luma_upper_value+luma_upper_value_diff[0]+ . . . +luma_upper_value_diff[i].

The changed upper area transformation curve type information upper_DR_transformation_curve_type[i] may identify a transformation curve used in the changed upper dynamic range area if an (i+1)-th dynamic range is supported. That is, the changed upper area transformation curve type information may identify a transformation curve in the changed upper dynamic range area if the mid dynamic range area is extended.

The changed upper area transformation curve detailed information upper_DR_transformation_curve( ) indicates additional information of the transformation curve identified by the changed upper area transformation curve type information upper_DR_transformation_curve_type[i]. That is, details of the transformation curve used in the changed upper dynamic range area if the (i+1)-th dynamic range is supported are indicated.

The changed upper dynamic range area percentage information upper_DR_percentage[i] indicates a percentage of the changed upper dynamic range area in the entire dynamic range of the display of the reception device if the mid dynamic range area of UHD broadcast content is changed.

The changed mid dynamic range area percentage information mid_DR_percentage[i] indicates a percentage of the changed mid dynamic range area in the entire dynamic range of the display of the reception device if the mid dynamic range area of UHD broadcast content is changed.

The HDR metadata according to one embodiment of the present invention may further include EOTF type information EOTF_type and/or EOTF additional information EOTF_additional_info. The EOTF type information EOTF_type may indicate the type of the EOTF used by a content producer for optimal image quality of HDR content. Even when a plurality of EOTF standards is established or a content producer defines and uses an arbitrary EOTF, a receiver may identify the type of the used EOTF using the EOTF type information. The EOTF additional information EOTF_additional_info is used to deliver additional information of the used EOTF if additional information needs to be delivered according to the EOTF type information. For given EOTF type information, if the coefficients of a plurality of EOTF functions need to be delivered under various conditions, a transmitter may provide information on the coefficients using the EOTF additional information EOTF_additional_info. For example, if the coefficient of the EOTF function is changed according to various maximum brightness conditions of content, all the coefficients according to the maximum brightness conditions should be delivered. In this case, the above-described EOTF additional information may be used through a method of separately defining a field indicating the number of maximum brightness conditions of content in the above-described EOTF additional information and indicating target maximum brightness information EOTF_target_max_brightness and information on the coefficients EOTF_coefficient[i] of the EOTF function under each maximum brightness condition.

FIG. 9 is a diagram showing mid area transformation curve type information mid_DR_transformation_curve_type according to one embodiment of the present invention.

If the value of the mid area transformation curve type information mid_DR_transformation_curve_type is 0x00, this indicates that a linear curve is used as a transformation curve and, if the value of the mid area transformation curve type information mid_DR_transformation_curve_type is 0x02, this indicates that a logarithmic curve is used as a transformation curve. If the value of the mid area transformation curve type information mid_DR_transformation_curve_type is 0x03, this indicates that an S curve is used as a transformation curve and, if the value of the mid area transformation curve type information mid_DR_transformation_curve_type is 0x04, this indicates that a combination curve is used as a transformation curve. If the value of the mid area transformation curve type information mid_DR_transformation_curve_type is 0x05, this indicates that an LUT is used.

Although the mid area transformation curve type information is shown in this figure, the same is true in the upper area transformation curve type information upper_DR_transformation_curve_type and the lower area transformation curve type information lower_DR_transformation_curve_type.

FIG. 10 is a diagram showing transformation curve detailed information DR_transformation_curve according to one embodiment of the present invention.

The transformation curve detailed information DR_transformation_curve according to one embodiment of the present invention may include gradient information gradient, base information coeff_a, coeff_b, intersection coordinate information intersection_x, y-intercept information coeff_a2, number-of-combined-curves information num_section, transformation curve type information DR_transformation_curve_type[i], entry length information entry_length, entry input information in_value and entry output information out_value.

The gradient information gradient indicates the gradient of a linear curve if a linear curve is used as a transformation curve.

The base information coeff_a, coeff_b indicates the base of an exponential function or a logarithmic function if an exponential curve, an S curve and/or a logarithmic curve is used as a transformation curve.

The intersection coordinate information intersection_x indicates the coordinates of the intersection if an S curve is used as a transformation curve.

The y-intercept information coeff_a2 indicates a y-intercept value of each of curves located at both sides of an intersection if an S curve is used as a transformation curve.

The number-of-combined-curves information num_section indicates the number of combined curves if a combination curve is used as a transformation curve.

The transformation curve_type information DR_transformation_curve_type[i] identifies the type of each of the combined curves if a combination curve is used as a transformation curve.

The entry length information entry_length indicates the length of an entry included in an LUT if an LUT is used for transformation of UHD broadcast content.

The entry input information in_value indicates a value input to an LUT if an LUT is used for transformation of UHD broadcast content.

The entry output information out_value indicates a value output from an LUT if an LUT is used for transformation of UHD broadcast content.

FIG. 11 is a diagram showing an event information table according to one embodiment of the present invention.

The event information table according to one embodiment of the present invention may include a table_id field, a section_syntax_indicator field, a private_indicator field, a section_length field, a source_id field, a version_number field, a current_next_indicator field, a section_number field, a last_section_number field, a protocol_version field, a num_events_in_section field, an event_id field, a start_time field, an ETM_location field, a length_in_seconds field, a title_length field, a title_text( ) field, a descriptors_length field, a descriptor( ) field and/or a CRC_32 field.

The table_id field identifies that the table is an EIT.

The section_syntax_indicator field is a 1-bit field, which is set to 1 to indicate the "long" form of an MPEG-2 private_section table.

The private_indicator field is a 1-bit field set to 1.

The section_length field indicates the length of a table section following this field in bytes.

The source_id field indicates a source id of a virtual channel for transmitting an event described in this section.

The version_number field is a 5-bit field indicating the version number of the table.

The current_next_indicator field is a 1-bit field indicating that this table is currently or next applicable.

The section_number field indicates the number of the section.

The last_section_number field identifies the number of a last section.

The protocol_version field is a field having a function for allowing, in the future, a current table type for transmitting parameters different from those defined in the current protocol.

The num_events_in_section field indicates the number of events included in this table section.

The event_id field identifies a specific number indicated by the described event. Here, the specific number may function as a part of an event ETM_id.

The start_time field indicates the start time of the event in GPS seconds. The value indicating the start time of the event in the virtual channel may be greater than the value indicating the end time of the event which is being broadcast. The end time of the event may be defined as a sum of the start time of the event and a time value of the length of the event.

The ETM_location field indicates whether an extended text message for a channel, an event or a data event is present.

The length_in_seconds field indicates the duration of the event in seconds.

The title_length field indicates the length of the title text title_text. If the value of this field is 0, this indicates that there is no title in this event.

The title_text( ) field indicates the title of the event in the form of multiple string structures.

The descriptors_length field indicates the total length of a subsequently described event descriptor.

The descriptor( ) field is a descriptor loop located in the table. The descriptor loop may include an additional descriptor. 0 or more descriptors may be included in the EIT and the descriptor may correspond to an event level descriptor describing information applied to each event. The HDR metadata according to one embodiment of the present invention may be included in the event level descriptor and transmitted. If the HDR metadata according to one embodiment of the present invention is included in the event level descriptor and transmitted, the reception device may check whether dynamic range transformation metadata of content is included at an event level and the determine whether reception device may accommodate the content. The descriptor including the HDR metadata may be referred to as a dynamic range transformation information descriptor and a detailed description thereof will be given below. A UHD program information descriptor including information for identifying the type of a UHD service may be included in the EIT and transmitted and a detailed description thereof will be given below.

The CRC_32 field includes a CRC value for checking integrity of data. The CRC value may guarantee that a value of 0 is output from a register of a decoder defined in Annex A of ISO-13818-1 "MPEG-2 Systems" [13] after all EIT sections are processed.

FIG. 12 is a diagram showing a dynamic range transformation information descriptor dynamic_range_transformation_info_descriptor according to one embodiment of the present invention.

The dynamic range transformation information descriptor dynamic_range_transformation_info_descriptor according to one embodiment of the present invention may include a descriptor_tag field, a descriptor_length field, a number_of_HDR_info field and/or a dynamic_range_transformation_metadata( ) field.

The descriptor_tag field identifies that this descriptor is a dynamic range transformation descriptor.

The descriptor_length field indicates the length of this descriptor.

The number_of_HDR_info field indicates the number of HDR metadata included in this descriptor and may indicate the number of HDR modes intended by a producer if the content transformation method is changed scene by scene.

The dynamic_range_transformation_metadata( ) field indicates information on a method of transforming UHD broadcast content to suit the display characteristics of the UHD broadcast signal reception device and brightness information of UHD broadcast content. This field may be referred to as HDR metadata and a description thereof will be given below.

FIG. 13 is a diagram showing HDR metadata dynamic_range_transformation_metadata( ) included in the dynamic range transformation information descriptor dynamic_range_transformation_info_descriptor( ) according to one embodiment of the present invention.

The HDR metadata dynamic_range_transformation_metadata( ) according to one embodiment of the present invention may include maximum reference brightness information luminance_max, minimum reference brightness information luminance_min, essential maximum brightness information luminance_upper_bound, essential minimum brightness information luminance_lower_bound, number-of-additional-areas information number_luminance_upper_bound_diff and/or additional area difference information luminance_upper_bound_diff[i].

The HDR metadata dynamic_range_transformation_metadata( ) according to one embodiment of the present invention may further include arbitrary EOTF information private_EOTF, number-of-EOTF-coefficient information number_of_coeff, EOTF coefficient information transfer_curve_coeff[i], clipping flag information clipping_flag, linear mapping flag information linear_mapping_flag, clipping maximum dynamic range information luma_clipping_upper_bound, clipping minimum dynamic range information luma_clipping_lower_bound, essential maximum brightness information luminance_upper_bound, essential minimum brightness information luminance_lower_bound, essential maximum digital value luma_upper_value, essential minimum brightness digital value luma_lower_value, mid area transformation curve_type information mid_DR_transformation_curve_type, mid area transformation curve detailed information mid_DR_transformation_curve( ), mid dynamic range area percentage information mid_DR_percentage, upper area transformation curve_type information upper_DR_transformation_curve_type, upper area transformation curve detailed information upper_DR_transformation_curve( ), upper dynamic range area percentage information upper_DR_percentage, lower area transformation curve type information lower_DR_transformation_curve_type, lower area transformation curve detailed information lower_DR_transformation_curve( ), additional area difference digital value luma_upper_value_diff[i], changed upper area transformation curve type information upper_DR_transformation_curve_type[i], changed upper area transformation curve detailed information upper_DR_transformation_curve( ), changed upper dynamic range area percentage information upper_DR_percentage[i] and/or changed mid dynamic range area percentage information mid_DR_percentage[i].

For the information included in the HDR metadata dynamic_range_transformation_metadata( ) according to one embodiment of the present invention, refer to the description of the HDR metadata (dynamic range transformation info(payloadSize) included and transmitted in the SEI message.

The HDR metadata dynamic_range_transformation_metadata( ) according to one embodiment of the present invention may further include EOTF type information EOTF_type and/or EOTF additional information EOTF_additional_info. The EOTF type information EOTF_type may indicate the type of the EOTF used by a content producer for optimal image quality of HDR content. Even when a plurality of EOTF standards is established or a content producer defines and uses an arbitrary EOTF standard, a receiver may identify the type of the used EOTF using the EOTF type information. The EOTF additional information EOTF_additional_info is used to deliver additional information of the used EOTF if additional information needs to be delivered according to the EOTF type information. For given EOTF type information, if the coefficients of a plurality of EOTF functions need to be delivered under various conditions, a transmitter may provide information on the coefficients using the EOTF additional information EOTF_additional_info. For example, if the coefficient of the EOTF function is changed according to various maximum brightness conditions of content, all the coefficients according to the maximum brightness conditions should be delivered. In this case, and the above-described EOTF additional information may be used through a method of separately defining a field indicating the number of maximum brightness conditions of content in the above-described EOTF additional information and indicating target maximum brightness information EOTF_target_max_brightness and information EOTF_coefficient[i] on the coefficients of the EOTF function under each maximum brightness condition.

According to one embodiment of the present invention, a plurality of HDR metadata may be present in one event. That is, the HDR metadata is not consistently applied to one piece of UHD broadcast content but different metadata may be applied according to scene and transformed by another method. In this case, the display of the UHD broadcast signal reception device according to one embodiment of the present invention needs to determine whether UHD broadcast content is accommodated. Dynamic range information of UHD broadcast content and criterion information necessary to categorize the display of the reception device may be transmitted using the HDR metadata according to one embodiment of the present invention.

FIG. 14 is a diagram showing a UHD program information descriptor UHD_program_info_descriptor( ) according to one embodiment of the present invention.

The UHD program information descriptor UHD_program_info_descriptor( ) according to one embodiment of the present invention may include a descriptor_tag field, a descriptor_length field and/or a UHD_service_type field.

The descriptor_tag field identifies that this descriptor is a dynamic range transformation information descriptor.

The descriptor_length field indicates the length of this descriptor.

The UHD_service_type field may provide information on the type of a UHD service to provide various UHD services. For example, as the type of the UHD service, there are UHD1 (4K) and UHD2 (8K). In addition, the type of the UHD service may be categorized according to image quality and may be arbitrarily specified by a user.

FIG. 15 is a diagram showing a UHD_service_type field included in the UHD program information descriptor UHD_program_info_descriptor( ) according to one embodiment of the present invention.

If the value of the UHD_service_type field according to one embodiment of the present invention is 0000, this indicates a UHD1 service and, if the value of the UHD_service_type field according to one embodiment of the present invention is 0001, this indicates a UHD2 service. If the value of the UHD_service_type field according to one embodiment of the present invention is 1000 to 1111, this indicates a specific service specified by a user. For example, the user may set UHD_service_type to 1001 (color enhanced UHD1 (4K) service) to indicate that color enhancement is used.

According to one embodiment of the present invention, UHD_service_type may be set to 1001 (color enhanced UHD1 (4K) service) to indicate that the display characteristics may be adjusted using metadata. If UHD_service_type is 0000 (UHD1 service), presence/absence of the dynamic range transformation information descriptor dynamic_range_transformation_info_descriptor( ) in the EIT may be checked to determine whether UHD broadcast content may be transformed to suit the display of the reception device using metadata.

According to one embodiment of the present invention, using the dynamic range transformation information descriptor dynamic_range_transformation_info_descriptor( ), whether the dynamic range of content desired to be played back by a content provider may be expressed on the display of a viewer may be determined. Thereby, whether HDR metadata is used for content played back currently or in the future may be determined and a receiver may be pre-set for scheduled recording.

FIG. 16 is a diagram showing a terrestrial virtual channel table (TVCT) according to one embodiment of the present invention.

The terrestrial virtual channel table (TVCT) according to one embodiment of the present invention may include a table_id field, a section_syntax_indicator field, a private_indicator field, a section_length field, a transport_stream_id field, a version_number field, a current_next_indicator field, a section_number field, a last_section_number field, a protocol_version field, a num_channels_in_section field, a short_name field, a major_channel_number field, a minor_channel_number field, a modulation mode field, a carrier_frequency field, a channel_TSID field, a program_number field, an ETM_location field, an access_controlled field, a hidden field, a hide_guide field, a service_type field, a source_id field, a descriptors_length field and a descriptor( ) field.

The table_id field identifies a table. Since the table shown in FIG. 9 is a TVCT, the value of table_id is 0x08.

The section_syntax_indicator field is a 1-bit field, which is set to 1 to indicate the "long" form of the MPEG-2 private_section table. (This 1-bit field shall be set to '1' to always indicate the "long" form of the MPEG-2 private_section table.)

The private_indicator field is a 1-bit field, which is set to 1. (This 1-bit field shall be set to '1'.)

The section_length field indicates the length of the table section following this field in bytes. (This is a 12-bit field, the first two bits of which shall be "00". It specifies the number of bytes of the section, starting immediately following the section_length field and including the CRC. The section_length shall not exceed 1021 so that the entire section has a maximum length of 1024 bytes.)

The transport_stream_id field indicates the identifier of an MPEG-2 transport stream (ST) included in the table. (To distinguish each transport stream within a single network (terrestrial, cable or satellite) from another, MPEG-2 established the use of a 16-bit (ranging from 0 to 65535) transport_stream_identifier, which is also called a TSID.)

The version_number field is a 5-bit field indicating the version number of the table. (This 5-bit field is the version number of the PSIP_section. The version_number shall be incremented by 1 modulo 32 when a change in the information carried within the PSIP_section occurs. When the current_next_indicator is set to '0', then the version_number shall be that of the next applicable PSIP_section with the same table_id, table_id_extension, and section_number.)

The current_next_indicator field is a 1-bit field indicating that this table is currently or next applicable. (A 1-bit field, which when set to '1' indicates that the PSIP_section sent is currently applicable. When the current_next_indicator is set to '1', then the version_number shall be that of the currently applicable PSIP_section. When the bit is set to '0', it indicates that the PSIP_section sent is not yet applicable and shall be the next PSIP_section with the same section_number, table_id_extension, and table_id to become valid.)

The section_number field indicates the number of the section. (This 8-bit field gives the number of the PSIP_section. The section_number of the first section in a PSIP table shall be 0x00. The section_number shall be incremented by 1 with each additional section in the PSIP table. The scope of the section_number shall be defined by the table_id and table_id_extension. That is, for each PSIP table and value of the table_id_extension field, there is the potential for the full range of section_number values.)

The last_section_number field identifies the number of the last section. (This 8-bit field specifies the number of the last section (that is, the section with the highest section_number) of the PSIP table of which this section is a part. Its scope is the same as that of the section_number field.)

The protocol_version field is a field having a function for allowing, in the future, a current table type for transmitting parameters different from those defined in the current protocol. (An 8-bit unsigned integer field whose function is to allow, in the future, this table type to carry parameters that may be structured differently from those defined in the current protocol. At present, the only valid value for protocol_version is zero. Non-zero values of protocol_version may be used by a future version of this standard to indicate structurally different tables.)

The num_channels_in_section field indicates the number of virtual channel definitions (The num_channels_in_section field in ATSC Cable Virtual Channel table CVCT table sections is an eight-bit field that indicates the number of virtual channel definitions to follow in the table section.)

The short_name field is a 112-bit field indicating the short channel for the virtual channel. (The short_name field is a 112-bit field in ATSC CVCT table sections that gives the short_name for the virtual channel. Each letter of the short_name is formatted as a 16-bit Unicode character, with the high order byte transmitted first. Therefore, short_name for TVCT and CVCT entries is seven Unicode characters, which short_name for SVCT entries is eight Unicode characters. If the display name is less than the number of permitted characters, 0/0x00 is appended to the end until the allocated number of bits has been reached.)

The major_channel_number field indicates the number of major channels associated with the virtual channel. (A 10-bit number that represents the "major" channel number associated with the virtual channel being defined in this iteration of the "for" loop. Each virtual channel shall be associated with a major and a minor channel number. The major channel number, and the minor channel number, act as the user's reference number for the virtual channel. The major_channel_number shall be between 1 and 99. The value of major_channel_number shall be set such that in no case is a major_channel_number/minor_channel_number pair duplicated within the TVCT.)

The minor_channel_number field indicates the number of minor channels associated with the virtual channel. (A 10-bit number in the range 0 to 999 that represents the "minor" or "sub"-channel number. This field, together with major_channel_number, serves as a two-part channel number, where minor_channel_number represents the second or right-hand part of the number. When the service_type is analog television, minor_channel_number shall be set to 0.)

The modulation mode field indicates the modulation mode of the carrier carrying the virtual channel. (The modulation_mode is an eight-bit field in a virtual channel entry that informs receivers of the modulation mode used to transmit individual channels.)

The carrier_frequency field transmits carrier frequency information used by the transport carrying the virtual channel. (The carrier frequency is a 32-bit field that transmits the carrier frequency used by the transport carrying the virtual channel.)

The channel_TSID field indicates the MPEG-2 transport stream ID of the transport stream (TS) for transmitting the MPEG-2 program associated with the virtual channel. (The channel_TSID is a 16-bit unsigned integer that gives the transport_stream_id of the channel that carries (for inactive channels, will carry) the virtual channel.)

The program_number field identifies each program service or virtual channel in the TS. (The program_number is a 16-bit unsigned integer that uniquely identifies each program service (or virtual channel) present in a transport stream.)

ETM_location field indicates whether there is an extended text message for the channel, event or data event. (The ETM_location field denotes whether there is an extended text message for the channel (Channel Extended Text table or CETT), event (Event Extended Text table) or data event (Data Extended Text table).)

The access_controlled field indicates whether the event associated with this virtual channel may be controlled. (When access_controlled is set to '1', means that events associated with this virtual channel may be access controlled. When set to '0', access to the events is not controlled.)

The hidden field means whether this channel may be accessed by direct entry (or field, attribute or entity) of the virtual channel number. (When hidden is set to '1', means the channel cannot be accessed by direct entry of the virtual channel number. When set to '0', virtual can be accessed by direct entry.)

The hide_guide field indicates whether this channel may be accessed by direct entry (or field, attribute or entity) of the virtual channel number. (When hide_guide is set to '1', this means that the channel cannot be accessed by direct entry of the virtual channel number. When set to '0', virtual can be accessed by direct entry.)

The service_type identifies the service type set in the virtual channel. (The service_type is a 6-bit enumerated field that identifies the type of service set in the virtual channel.) As one embodiment of the UHD service, the service type may be set to parameterized service (0x07), extended parameterized service (0x09) or new DTV service (0x10). The above-described service name and value are exemplary and may have another name or value.

The source_id field is a 16-bit unsigned integer to indicate the programming source associated with the virtual channel. (A 16-bit unsigned integer that identifies the programming source associated with the virtual channel. In this context, a source is one specific source of video, text, data, or audio programming. Source ID value zero is reserved. Source ID values in the range 0x0001 to 0x0FFF shall be unique within the Transport Stream that carries the VCT, while values 0x1000 to 0xFFFF shall be unique at the regional level. Values for source_ids 0x1000 and above shall be issued and administered by a Registration Authority designated by the ATSC.)

The descriptors_length field signals the length of the following descriptor field in bytes. (The descriptors_length is a 10-bit unsigned integer field that signals the length in bytes of the descriptor field to follow. If no descriptors are present, zero would be appropriate.)

The descriptor( ) field is a descriptor loop located in the table. The descriptor loop may include additional descriptors.

Figures 17, 18:
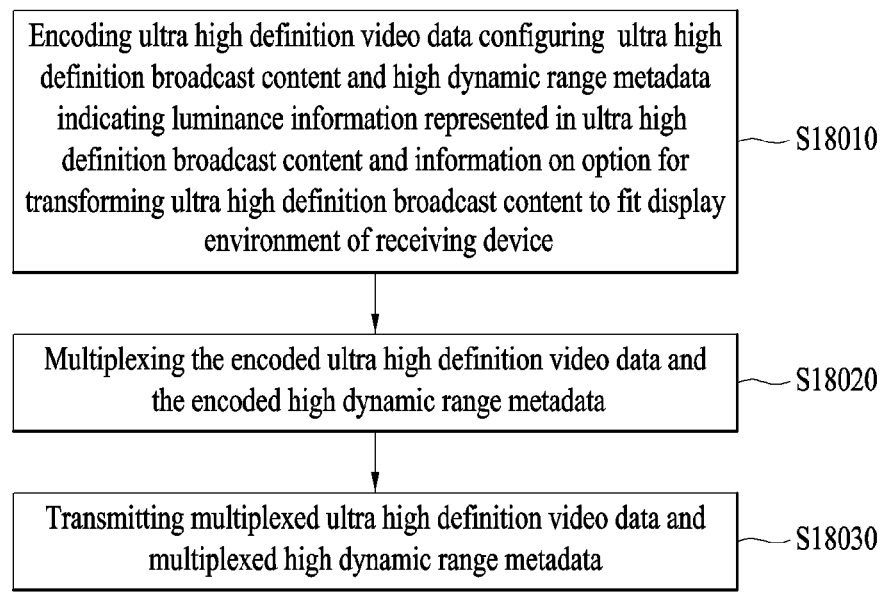
FIG. 17 is a diagram to illustrate a descriptor capable of identifying an ultra high definition broadcasting service according to one embodiment of the present invention.
FIG. 18 is a diagram to illustrate an ultra high definition broadcast signal transmitting method according to one embodiment of the present invention.

FIG. 17 is a diagram showing a descriptor capable of identifying a UHD broadcast service according to one embodiment of the present invention.

Whether UHD video is serviced in the TVCT according to one embodiment of the present invention may be signaled by the above-described method.

If service_type is 0x07, a video service may be described and whether the stream may be decoded and played back by the reception device may be determined using the information included in stream_info_details( ) transmitted via a component list descriptor. In addition, information on a UHD service may be provided via a UHD descriptor and/or a service location descriptor.

If service_type is 0x09, a parameterized service descriptor may be further used. Using this, detailed information on a UHD service may be provided. In addition, information on a UHD service may be provided via a component list descriptor and/or a service location descriptor.

If service_type is 0x10, information on a UHD service may be provided via a UHD descriptor and/or a service location descriptor.

FIG. 18 is a diagram to illustrate UHD (ultra high definition) broadcast signal transmitting method according to one embodiment of the present invention.

According to one embodiment of the present invention, a UHD (ultra high definition) broadcast signal can be transmitted through a process described as follows. First of all, a transmitting side encodes UHD video data and high dynamic range (HDR) metadata [S18010]. In this case, the UHD video data may be included in a UHD broadcast content, and the high dynamic range metadata indicates an information on luminance represented in the UHD broadcast content and an information on a method of transforming a broadcast content to fit a display environment of a UHD broadcast signal receiving device according to one embodiment of the present invention. Details of the high dynamic range metadata are already described with reference to FIG. 8 and FIG. 13. Subsequently, the transmitting side multiplexes the encoded UHD video data and the encoded high dynamic range metadata [S18020] and then transmits the multiplexed UHD video data and high dynamic range metadata [S18030]. In doing so, the high dynamic range metadata may not be multiplexed with the UHD video data. The multiplexed UHD video data and/or high dynamic range metadata may be transmitted at least one of a terrestrial broadcasting network, a cable network, and an Internet Protocol network.

According to another embodiment of the present invention, the high dynamic range metadata may include at least one of a maximum reference luminance information indicating a maximum reference luminance represented in the UHD broadcast content, a minimum reference luminance information indicating a minimum reference luminance represented in the UHD broadcast content, a mandatory maximum luminance information indicating a maximum value of a mandatorily represented dynamic range in a dynamic range represented in the UHD broadcast content, a mandatory minimum luminance information indicating a minimum value of the mandatorily represented dynamic range in the dynamic range represented in the UHD broadcast content, and an additional region difference information used to extend the mandatorily represented dynamic range in the dynamic range represented in the UHD broadcast content. Details of the informations included in the high dynamic range metadata are already described with reference to FIG. 8 and FIG. 13.

According to another embodiment of the present invention, the dynamic range represented in the UHD broadcast content is divided using the mandatory minimum luminance information, the mandatory maximum luminance information, the maximum reference luminance information and the minimum reference luminance information included in the high dynamic range metadata, and the UHD broadcast content can be transformed by a different kind of a transforming method for each divided section. In this case, the dynamic range represented in the UHD broadcast content can be divided into a core dynamic range region corresponding to a region between a value indicated by the mandatory minimum luminance information and a value indicated by the mandatory minimum luminance information, an upper dynamic range region corresponding to a region between a value indicated by the mandatory maximum luminance information and a value indicated by the minimum reference luminance information, and a lower dynamic range region corresponding to a region between a value indicated by the minimum reference luminance information and a value indicated by the mandatory minimum luminance information. Details of the division of the UHD broadcast content are already described with reference to FIG. 1 and FIG. 3.

According to another embodiment of the present invention, the high dynamic range metadata may include at least one of a transformation curve type information for identifying a type of a transformation curve used for transformation of the UHD broadcast content in each divided dynamic range section of the UHD broadcast content, a transformation curve detailed information indicating detailed information on the identified transformation curve, and a luminance region rate information indicating a rate occupied by each section of the divided dynamic range in a representable dynamic range of the receiving device. The aforementioned UHD broadcast content can be divided into the core dynamic range region, the upper dynamic range region, and the lower dynamic range region. And, a type of the transformation curve used for each section may be different. The aforementioned transformation curve type information may differ in each of the divided dynamic ranges of the UHD broadcast content. And, the aforementioned transformation curve type information may include a core region transformation curve type information, an upper region transformation curve type information and/or a lower region transformation curve type information. Likewise, the aforementioned transformation curve detailed information may differ in each of the divided dynamic range sections of the UHD broadcast content, and the transformation curve detailed information may include a core region transformation curve detailed information, an upper region transformation curve detailed information, and/or a lower region transformation curve detailed information. Likewise, the aforementioned luminance region rate information may differ in each of the divided dynamic range sections of the UHD broadcast content, and the luminance region rate information may include a core luminance region rate information, an upper luminance region rate information, and/or a lower luminance region rate information. Details of the transformation curve type information, the transformation curve detailed information and the luminance region rate information are already described with reference to FIG. 8 and FIG. 13.

According to another embodiment of the present invention, the core dynamic range region may be extended using the additional region difference information included in the high dynamic range metadata. As the core dynamic range region is extended, the upper dynamic range region may be changed.

According to another embodiment of the present invention, the high dynamic range metadata may include a clipping flag information indicating a presence or non-presence of a use of a clipping operation for playing luminance of a specific range in the dynamic range represented in the UHD broadcast content only and a clipping dynamic range information indicating luminance of a specific range played in the dynamic range represented in the UHD broadcast content in case of the presence of the use of the clipping option. In this case, the aforementioned clipping dynamic range information may include a clipping maximum dynamic range information (luma_clipping_upper_bound) and a clipping minimum dynamic range information (luma_clipping_lower_bound). Details of the clipping flag information, the clipping dynamic range information, the clipping maximum dynamic range information and the clipping minimum dynamic range information are already described with reference to FIG. 3, FIG. 4 and FIG. 9.

According to another embodiment of the present invention, the high dynamic range metadata may be transmitted in a manner of being included in the SEI message or the event information table (EIT) containing information on each event configuring the UHD broadcast content. The corresponding details are already described with reference to FIG. 7, FIG. 8 and FIGS. 11 to 13.

According to further embodiment of the present invention, the high dynamic range metadata may be transmitted in the event level descriptor for describing information applied to each event in the event information table (EIT). The corresponding details are already described with reference to FIGS. 11 to 13.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

Meanwhile, an image processing method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Mode for Invention

As mentioned in the foregoing description, the mode for the invention is described as the best mode for the implementation of the invention.

INDUSTRIAL APPLICABILITY

The present invention is applicable to the overall fields of the broadcasting industry.

What is claimed is:

1. An apparatus for receiving an UHD (ultra high definition) broadcast signal, comprising:
a receiving unit receiving the UHD broadcast signal including an UHD broadcast content and high dynamic range metadata indicating luminance information represented in the UHD broadcast content and transformation information for transforming the UHD broadcast content to fit on a display of a receiver,
wherein the high dynamic range metadata includes maximum luminance information indicating a maximum luminance value represented in the UHD broadcast content, minimum luminance information indicating a minimum luminance value represented in the UHD broadcast content, essential maximum luminance information indicating a maximum luminance value of an essential dynamic range which is represented essentially to represent the UHD broadcast content and essential minimum luminance information indicating a minimum luminance value of an essential dynamic range which is represented essentially to represent the UHD broadcast content;
a decoder configured to decode the received UHD broadcast content;
a dividing unit configured to classify the display of the receiver into a high dynamic range display, a mid dynamic range display and a low dynamic range display using the maximum luminance information, the essential maximum luminance information, the essential minimum luminance information and luminance values of the display of the receiver;
a control unit configured to transform the UHD broadcast content when the display of the receiver is classified into the mid dynamic range display or the low dynamic range display,
wherein the control unit divides an entire dynamic range of the UHD broadcast content into plural regions using the maximum luminance information, the minimum luminance information, the essential maximum luminance information and the essential minimum luminance information, and transforms the UHD broadcast content according to different transformation curves applied to each of the plural regions using the transformation information; and
a play unit configured to play the UHD broadcast content.

2. The apparatus of claim 1, wherein the high dynamic range metadata further includes additional region difference information used to extend the essential dynamic range.

3. The apparatus of claim 2, wherein the entire dynamic range of the UHD broadcast content is divided into an essential dynamic range region corresponding to a region between a value indicated by the essential minimum luminance information and a value indicated by the essential maximum luminance information, an upper dynamic range region corresponding to a region between a value indicated by the essential maximum luminance information and a value indicated by the maximum luminance information, and a lower dynamic range region corresponding to a region between a value indicated by the minimum luminance information and a value indicated by the essential minimum luminance information.

4. The apparatus of claim 3, wherein the control unit extends the essential dynamic range region using the additional region difference information included in the high dynamic range metadata and wherein the upper dynamic range region is changed correspondingly.

5. The apparatus of claim 1, wherein the dividing unit classifies the display of the receiver into the low dynamic range display when a maximum luminance value of the display of the receiver is equal to or smaller than a value indicated by the essential maximum luminance information, into the mid dynamic range display when the maximum luminance value of the display of the receiver is greater than the value indicated by the essential maximum luminance information and smaller than a value indicated by the maximum luminance information, and into the high dynamic range display when the maximum luminance value of the display of the receiver is equal to or greater than the value indicated by the maximum luminance information.

6. The apparatus of claim 1, wherein the control unit is configured not to transform the UHD broadcast content when the display of the receiver is classified into the high dynamic range display.

7. The apparatus of claim 1, wherein the high dynamic range metadata further includes transformation curve type information for identifying a type of a transformation curve used for transformation of the UHD broadcast content in each of the plural regions, transformation curve detailed information indicating detailed information on the identified transformation curve, and luminance region percentage information indicating a percentage of each of the plural regions in a representable dynamic range of the receiver.

8. The apparatus of claim 7, wherein the high dynamic range metadata is transmitted in a SEI message or an event information table (EIT) containing information on each event configuring the UHD broadcast content.

9. The apparatus of claim 1, wherein the high dynamic range metadata further includes clipping flag information indicating a presence or non-presence of a use of a clipping operation for displaying luminance of a specific range in the entire dynamic range of the UHD broadcast content only and clipping dynamic range information indicating luminance of a specific range displayed in the entire dynamic range of the UHD broadcast content in case of the presence of the use of the clipping option and wherein if the clipping option is used, luminance of a specific range indicated by the clipping dynamic range information is displayed only.

10. The apparatus of claim 1, wherein the high dynamic range metadata is transmitted in a SEI message or an event information table (EIT) containing information on each event configuring the UHD broadcast content.

11. A method of transmitting an UHD (ultra high definition) broadcast signal, comprising the steps of:
encoding an UHD video data configuring an UHD broadcast content and high dynamic range metadata indicating luminance information represented in the UHD broadcast content and transformation information for transforming the UHD broadcast content to fit on a display of a receiver;
wherein the high dynamic range metadata includes maximum luminance information indicating a maximum luminance value represented in the UHD broadcast content, minimum luminance information indicating a minimum luminance value represented in the UHD broadcast content, essential maximum luminance information indicating a maximum luminance value of an essential dynamic range which is represented essentially to represent the UHD broadcast content and essential minimum luminance information indicating a minimum luminance value of an essential dynamic range which is represented essentially to represent the UHD broadcast content,
wherein the maximum luminance information, the essential maximum luminance information, the essential minimum luminance information and luminance values of the display of the receiver are used to classify the display of the receiver into a high dynamic range display, a mid dynamic range display and a low dynamic range display,
wherein the maximum luminance information, the minimum luminance information, the essential maximum luminance information and the essential minimum luminance information are used to divide an entire dynamic range of the UHD broadcast content into plural regions,
wherein the transformation information is used to transform the UHD broadcast content according to different transformation curves applied to each of the plural regions;
multiplexing the encoded UHD video data and the encoded high dynamic range metadata; and
transmitting the multiplexed UHD video data and the multiplexed high dynamic range metadata.

12. The method of claim 11, wherein the high dynamic range metadata further includes additional region difference information used to extend the essential dynamic range.

13. The method of claim 12, wherein the high dynamic range metadata is transmitted a SEI message or an event information table (EIT) containing information on each event configuring the UHD broadcast content.

14. The method of claim 12, wherein the entire dynamic range of the UHD broadcast content is divided into an essential dynamic range region corresponding to a region between a value indicated by the essential minimum luminance information and a value indicated by the essential maximum luminance information, an upper dynamic range region corresponding to a region between a value indicated by the essential maximum luminance information and a value indicated by the maximum luminance information, and a lower dynamic range region corresponding to a region between a value indicated by the minimum luminance information and a value indicated by the essential minimum luminance information.

15. The method of claim 14, wherein the essential dynamic range region is extended using the additional region difference information included in the high dynamic range metadata and wherein the upper dynamic range region is changed correspondingly.

16. The method of claim 11, wherein the high dynamic range metadata further includes transformation curve type information for identifying a type of a transformation curve used for transformation of the UHD broadcast content in each of the plural regions, transformation curve detailed information indicating detailed information on the identified transformation curve, and luminance region percentage information indicating a percentage of each of the plural regions in a representable dynamic range of the receiver.

17. The method of claim 16, wherein the high dynamic range metadata is transmitted in a SEI message or an event information table (EIT) containing information on each event configuring the UHD broadcast content.

18. The method of claim 11, wherein the high dynamic range metadata further includes clipping flag information indicating a presence or non-presence of a use of a clipping operation for displaying luminance of a specific range in the entire dynamic range of the UHD broadcast content only and clipping dynamic range information indicating luminance of a specific range displayed in the dynamic range of the UHD broadcast content in case of the presence of the use of the clipping option.

* * * * *